US012797878B2

(12) United States Patent
Alluigi

(10) Patent No.: US 12,797,878 B2
(45) Date of Patent: Nov. 17, 2026

(54) TRIGGER DISPENSING HEAD WITH MEANS TO PREVENT LEAKAGE OF PRODUCT

(71) Applicant: GUALA DISPENSING S.P.A., Alessandria (IT)

(72) Inventor: Riccardo Alluigi, Alessandria (IT)

(73) Assignee: GUALA DISPENSING S.P.A., Alessandria (IT)

( * ) Notice: Subject to any disclaimer, the term of this patent is extended or adjusted under 35 U.S.C. 154(b) by 236 days.

(21) Appl. No.: 18/568,435

(22) PCT Filed: Jun. 28, 2022

(86) PCT No.: PCT/IB2022/055978
§ 371 (c)(1),
(2) Date: Dec. 8, 2023

(87) PCT Pub. No.: WO2023/275732
PCT Pub. Date: Jan. 5, 2023

(65) Prior Publication Data
US 2024/0269699 A1 Aug. 15, 2024

(30) Foreign Application Priority Data
Jul. 1, 2021 (IT) ........................ 102021000017402

(51) Int. Cl.
*B05B 11/10* (2023.01)
*B05B 11/00* (2023.01)
*F16J 1/00* (2006.01)

(52) U.S. Cl.
CPC ........ *B05B 11/0044* (2018.08); *B05B 11/105* (2023.01); *B05B 11/1057* (2023.01);
(Continued)

(58) Field of Classification Search
CPC ............... B05B 11/105; B05B 11/1057; B05B 11/1067; B05B 11/104; B05B 11/1064;
(Continued)

(56) References Cited

U.S. PATENT DOCUMENTS 4,072,252 A * 2/1978 Steyns ................ B05B 11/1011 222/341
4,489,861 A * 12/1984 Saito ................... B05B 11/1011 137/853
(Continued)

FOREIGN PATENT DOCUMENTS

CN 1256973 A * 6/2000 .......... B05B 11/1011
EP 0441377 A2 * 8/1991 ......... B05B 11/0044
(Continued)

OTHER PUBLICATIONS

Pump Users Handbook (Fourth Edition), Elsevier Science, 1995, pp. 39-110 (Year: 1995).*
(Continued)

*Primary Examiner* — Paul R Durand
*Assistant Examiner* — Michael C Patterson
(74) *Attorney, Agent, or Firm* — Armstrong Teasdale LLP

(57) ABSTRACT

A trigger dispensing head applicable to a bottle of a trigger dispensing device is provided. The trigger dispensing head has a cylinder chamber, a main vent passage, a sleeve, a secondary vent passage, a piston, a suction duct, a dispensing duct and a labyrinth seal suitable for placing the main vent passage in fluidic connection with the external environment. The labyrinth seal is formed on either an external surface of the sleeve or an internal surface of the cylinder chamber.

17 Claims, 18 Drawing Sheets

(52) U.S. Cl.
CPC ...... *B05B 11/1064* (2023.01); *B05B 11/1067* (2023.01); *F16J 1/003* (2013.01); *B05B 11/0008* (2013.01); *B05B 11/0029* (2013.01); *B05B 11/1011* (2023.01); *B05B 11/104* (2023.01)

(58) Field of Classification Search
CPC ............. B05B 11/1011; B05B 11/0044; B05B 11/0008; B05B 11/0029; F16J 1/003; B65D 51/1611
USPC ................................................ 222/383.1, 542
See application file for complete search history.

(56) References Cited

U.S. PATENT DOCUMENTS

| | | | | | |
|---|---|---|---|---|---|
| 4,618,077 | A * | 10/1986 | Corsette | B05B 11/0044 | 222/340 |
| 4,747,523 | A * | 5/1988 | Dobbs | B05B 11/1011 | 239/526 |
| 5,042,721 | A * | 8/1991 | Muntean | F02M 59/30 | 239/533.3 |
| 5,353,969 | A | 10/1994 | Balderrama | | |
| 5,711,457 | A * | 1/1998 | Wanbaugh | B05B 11/1011 | 222/341 |
| 5,738,250 | A * | 4/1998 | Gillingham | B05B 11/0044 | 222/321.9 |
| 5,779,108 | A * | 7/1998 | Barriac | B05B 11/1074 | 222/340 |
| 5,988,454 | A * | 11/1999 | Ellion | B05B 11/0044 | 222/376 |
| 6,095,377 | A * | 8/2000 | Sweeton | B05B 11/1011 | 222/383.1 |
| 6,223,933 | B1 | 5/2001 | Hochrainer et al. | | |
| 6,257,455 | B1 * | 7/2001 | Trepina | B05B 11/1047 | 222/189.09 |
| 6,890,162 | B2 * | 5/2005 | Ding | B05B 11/105 | 222/321.9 |
| 7,073,690 | B2 * | 7/2006 | Marelli | B05B 11/0044 | 222/321.9 |
| 9,962,724 | B2 * | 5/2018 | Fujiwara | B05B 11/1002 | |
| 11,400,474 | B2 * | 8/2022 | Heinzle | B05B 11/1087 | |
| 12,246,333 | B2 * | 3/2025 | Liang | B05B 11/007 | |
| 2006/0086763 | A1 * | 4/2006 | Foster | B05B 11/1011 | 222/383.1 |
| 2007/0262090 | A1 * | 11/2007 | Ritsche | B05B 11/0044 | 222/189.09 |
| 2008/0029619 | A1 * | 2/2008 | Gohring | B05B 7/0815 | 239/596 |
| 2008/0277430 | A1 * | 11/2008 | Maas | B05B 11/1011 | 222/376 |
| 2012/0181300 | A1 * | 7/2012 | Maxa | B65D 83/764 | 222/386 |
| 2015/0151315 | A1 * | 6/2015 | Alluigi | B05B 11/007 | 222/380 |
| 2019/0101108 | A1 * | 4/2019 | Lee | B05B 11/1001 | |
| 2021/0308705 | A1 * | 10/2021 | Lee | B05B 11/0044 | |
| 2023/0191441 | A1 * | 6/2023 | Carstens | B05C 5/0216 | 222/198 |
| 2023/0249202 | A1 * | 8/2023 | Hess | B05B 3/1035 | 239/223 |

FOREIGN PATENT DOCUMENTS

| | | | | |
|---|---|---|---|---|
| EP | 0453434 | A1 * | 10/1991 | B65D 51/1611 |
| EP | 0825128 | A2 * | 2/1998 | B05B 11/1047 |
| JP | H10174913 | A * | 6/1998 | B05B 11/3011 |
| JP | H11221501 | A | 8/1999 | |
| WO | WO-2004056490 | A1 * | 7/2004 | B05B 11/1001 |
| WO | 2006075753 | A1 | 7/2006 | |
| WO | 2012069939 | A1 | 5/2012 | |
| WO | 2014013352 | A1 | 1/2014 | |
| WO | 2020023703 | A1 | 1/2020 | |
| WO | WO-2022175866 | A1 * | 8/2022 | B05B 11/1059 |

OTHER PUBLICATIONS

EP 0441377 machine translation into English (Year: 2026).*
EP 0453434 machine translation into English (Year: 2026).*
International Search Report for International Patent Application No. PCT/IB2022/055978, mailed Oct. 13, 2022.

* cited by examiner

TRIGGER DISPENSING HEAD WITH MEANS TO PREVENT LEAKAGE OF PRODUCT

CROSS-REFERENCE TO RELATED APPLICATION

This application is a National Stage Application of International Patent Application No. PCT/IB2022/055978, having an International Filing Date of Jun. 28, 2022, which claims priority to Italian Application No. 102021000017402, filed Jul. 1, 2021, the entire contents of each of which are hereby incorporated by reference herein.

FIELD OF THE INVENTION

This invention is in the field of trigger dispensing devices, typically used for dispensing liquid products for household hygiene, personal care, and countless other purposes. In particular, the subject of this invention is a trigger dispensing head applicable to a bottle, provided with an anti-leakage device to prevent leakage of product from the venting duct.

BACKGROUND OF THE INVENTION

Trigger dispensing devices are enormously popular today; several hundred million units are manufactured and sold each year.

Traditionally, once the bottle has been filled with the product and the dispensing head has been applied to the bottle, the devices are placed in specially sized cardboard boxes so that they may safely travel to storage or sales locations. In particular, despite loading and unloading from the transport and storage means, the boxes ensure that the devices are not subject to shocks that could compromise their functionality or cause product spillage. Further, the placement of individual devices on supermarket shelves is also done by attentive staff and generally with great care.

For some years now, online commerce has been widely used by consumers for the purchase of food, detergents, and every other kind of merchandise. The widespread use of these sales methods has manifested new needs and raised new issues for the trigger dispensing device industry as well.

In fact, it is quite common for said devices to be stored in less than optimal conditions, or for a device to be shipped to the consumer in a standard-sized box that is larger than said device, or for other goods, such as a book or other bottles, to be placed in the same box.

During transport, the device is subjected to impacts and crushing, which may lead to the breakage of components such as the trigger or the shell, disassembly, undesired activation of the trigger and, often, to product leakage.

One of the drawbacks encountered is the leakage of product through the venting duct, which usually places the internal compartment of the bottle in communication with the external environment, necessary for the entry of air into the bottle during the suction step, while the product is suctioned from the bottle towards the pressure chamber.

SUMMARY OF INVENTION

It is the object of this invention to make a trigger dispensing head which meets the aforesaid requirements and overcomes the drawbacks mentioned above.

This object is achieved by a dispensing head as described and claimed herein. Advantageous embodiments of the present invention are also described.

BRIEF DESCRIPTION OF THE DRAWINGS

The features and advantages of the dispensing head according to this invention will be apparent from the description below, given by way of non-limiting example in accordance with the figures in the appended drawings, wherein.

DETAILED DESCRIPTION

Figure 1:
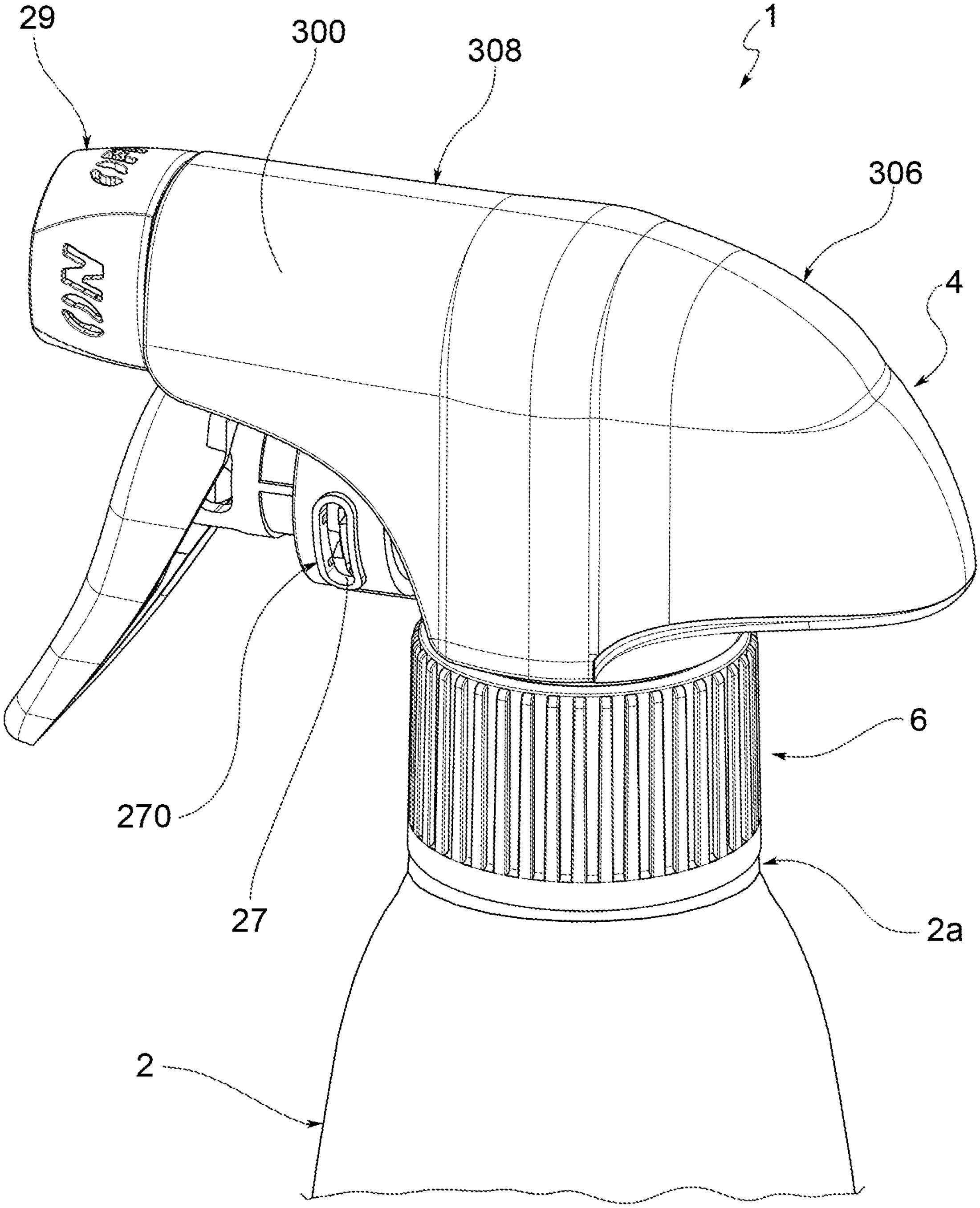
FIG. 1 depicts a trigger dispensing device according to an embodiment of this invention.
Figure 2A:
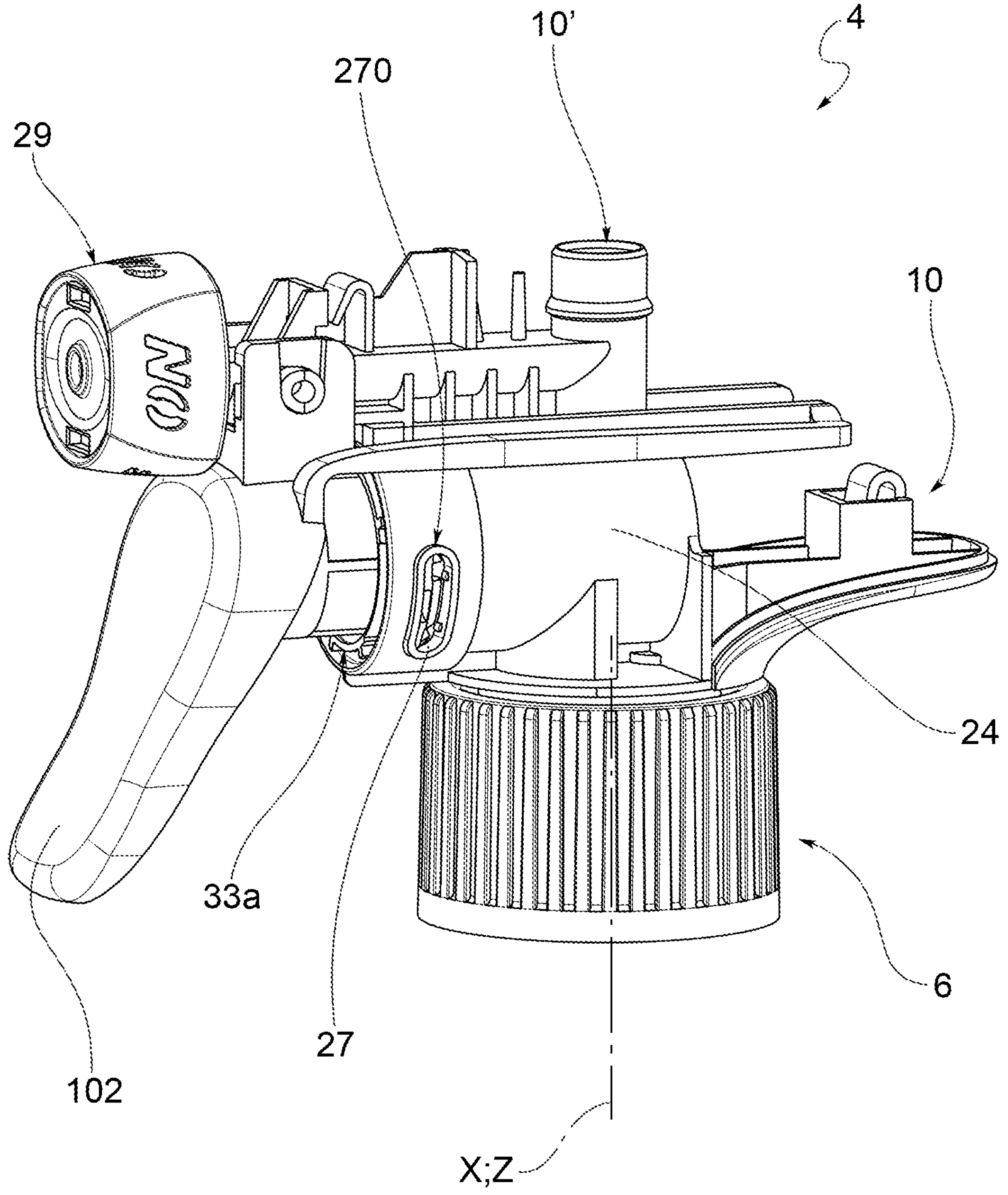
FIG. 2*a* shows a trigger dispensing head without the shell.
Figure 2C:
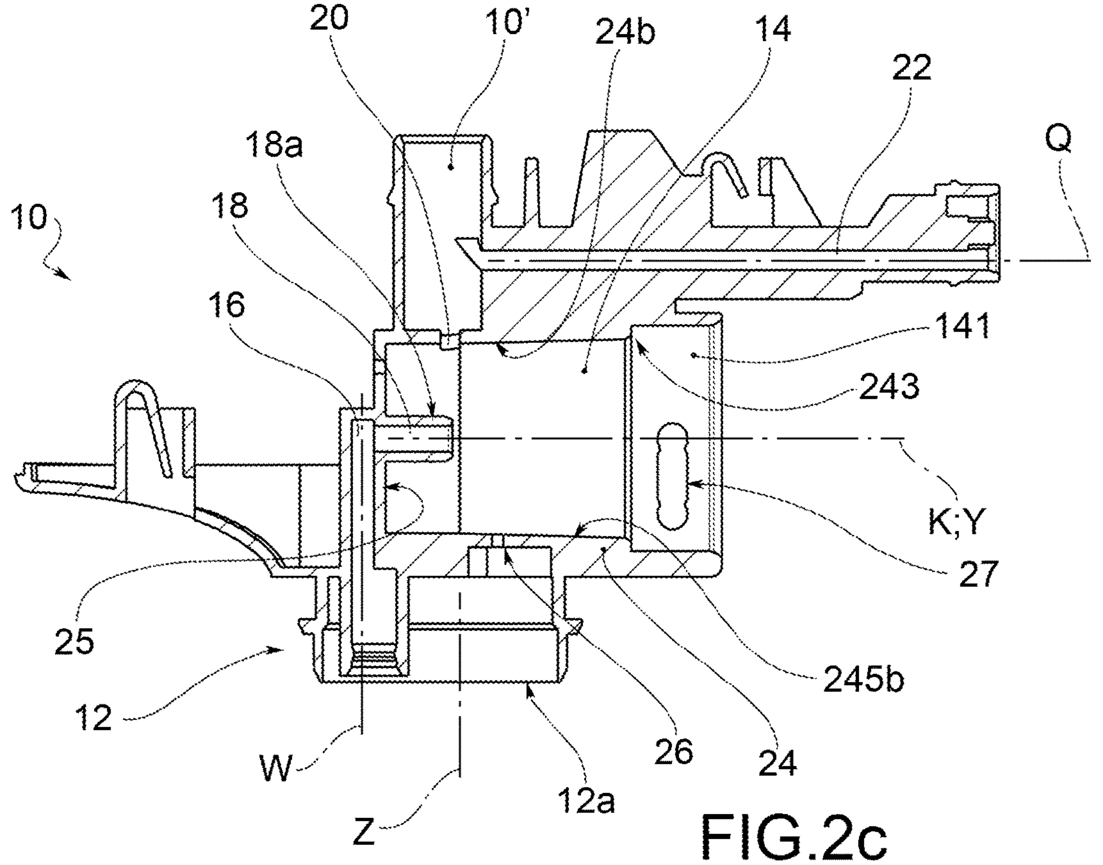
FIGS. 2*b* and 2*c* show a frame of the dispensing head and a sectional view thereof, respectively.
Figure 2B:
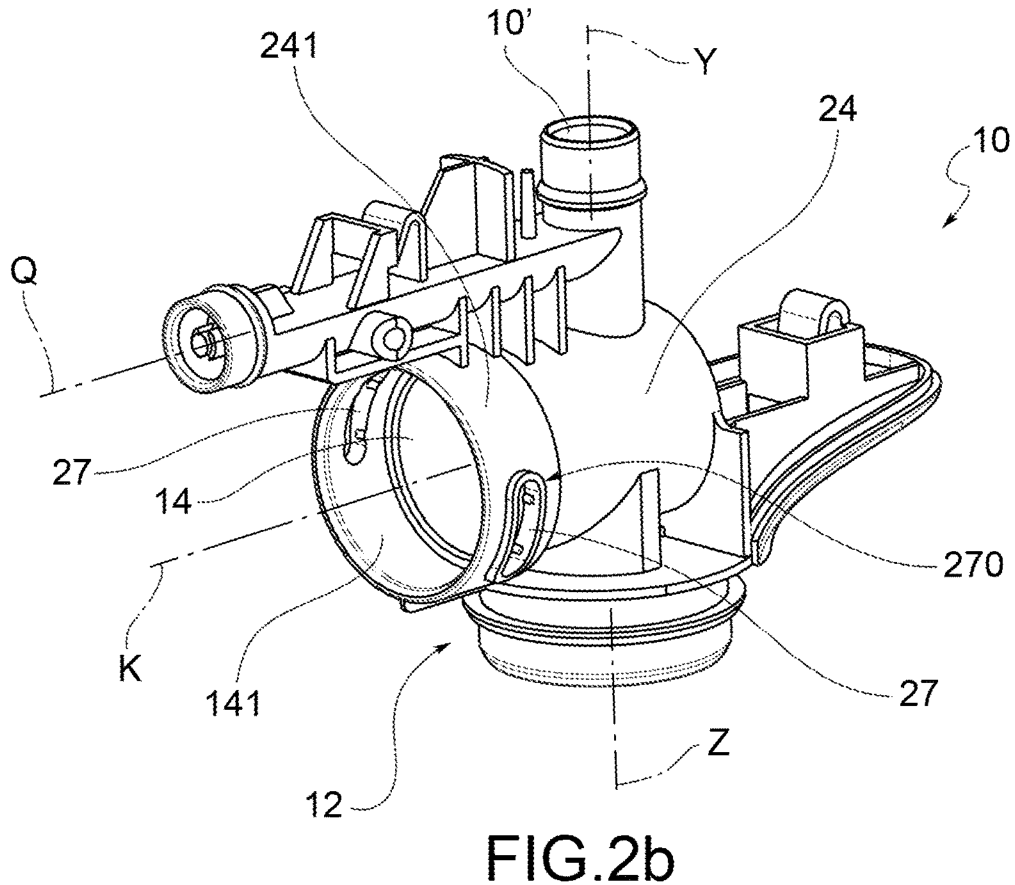

With reference to the figures of the appended drawings, a trigger dispensing device comprising a bottle 2 for containing a liquid product to be dispensed and a trigger dispensing head 4 applied to a neck 2*a* of the bottle have been collectively referred to as 1. The neck 2*a* has a neck axis X.

The head 4 is applicable to the bottle 2 by means of a ferrule system comprising a threaded ferrule 6 which may be screwed to the neck 2*a* or, according to a variant embodiment, by means of a bayonet system (not shown), preferably equipped with an anti-removal ridge.

The head 4 comprises a frame 10, preferably made in one piece of plastic material, for example by injection molding, adapted to support the components of the head 4.

The frame 10 comprises an attachment portion 12 provided with a main opening 12*a* having an attachment axis Z; when the head 4 is applied to the neck 2*a*, the main opening 12*a* is in communication with the compartment inside the neck 2*a*, and the attachment axis Z is coincident with the neck axis X.

The head 4 also comprises a cylinder chamber 14, of cylindrical circular shape, for example having a chamber axis K orthogonal to the attachment axis Z; preferably, the cylinder chamber 14 is formed in the frame 10.

The head 4 further comprises a suction duct that connects the main opening 12*a* with the cylinder chamber 14.

Preferably, said suction duct comprises a first suction segment 16 which, starting from the main opening 12*a*, extends along a first suction axis W, parallel to and preferably spaced apart from the attachment axis Z, and a second suction segment 18 which flows into the cylinder chamber 14 and extends along a second suction axis Y, parallel to the chamber axis K; for example, the second suction axis Y is coincident with the chamber axis K. The second suction segment 18 is delimited by a suction mouth 18*a*.

Preferably, moreover, the first suction segment 16 and/or the second suction segment 18 are formed in the frame 10.

The head 4 further comprises a dispensing duct that places the cylinder chamber 14 in communication with the external environment.

Preferably, the dispensing duct comprises a first dispensing section 20 which, starting from the cylinder chamber 14, extends along a first suction axis J incident, for example orthogonal, to the chamber axis K, and a second dispensing section 22 which opens into the external environment and extends along a second dispensing axis Q parallel to the chamber axis K.

Preferably, the first dispensing section 20 and/or the second dispensing section 22 are formed in the frame 10.

Preferably, the dispensing head 4 further comprises a nozzle 29, applied to the free end of the second dispensing section 22, preferably rotatable at least between a dispensing position, in which the second dispensing section 22 is in communication with the external environment, and a closed position, in which fluid communication between the second dispensing section 22 and the external environment is prevented.

Preferably, the first dispensing section 20 is positioned in a rear region of the dispensing head 4, and the nozzle 29 is positioned in a front region of the dispensing head 4.

The dispensing head 4 further comprises a cylinder wall 24, having an internal surface 24*b* which annularly delimits the cylinder chamber 14. In the cylinder wall 24, a main vent passage 26 is formed which places the main opening 12*a* in communication with the cylinder chamber 14, and in particular with the internal surface 24*b*.

Preferably, the cylinder chamber 14 is delimited at the bottom by a bottom wall 25, for example from which the suction mouth 18*a* of the suction duct projects, and in particular the second suction segment 18.

The head 4 further comprises a sleeve 30, inserted in the cylinder chamber 14.

According to an embodiment, the sleeve 30 is inserted into the cylinder chamber 14 in a fixed angular position, i.e. constrained to rotation around the chamber axis K.

According to a different embodiment (not shown), the sleeve 30 is rotatably coupled in the cylinder chamber 14, i.e. it is free to rotate around the chamber axis K.

The sleeve 30 comprises a cylindrical sleeve wall 32 having an external surface 32*a* and an internal surface 32*b*.

The dispensing head 4 further comprises a labyrinth seal 35, suitable for placing the main vent passage 26 in communication with the external environment.

In particular, one of the external surface 32*a* of the sleeve 30 and the internal surface 24*b* of the cylinder chamber 14 comprises a labyrinth seal 35 suitable for placing the main vent passage 26 in communication with the external environment.

According to an embodiment, the labyrinth seal 35 is on the external surface 32*a* of the sleeve 30.

According to a different embodiment (not shown), the labyrinth seal 35 is on the internal surface 24*b* of the cylinder chamber 14.

Preferably, the labyrinth seal 35 comprises a channel 35', suitable for placing the main vent passage 26 in communication with the external environment. For example, the channel 35' has a circumferential or spiral extension. In an embodiment variant (not shown), the channel 35' is linear and curvilinear, for example linear in sections.

Furthermore, the sleeve 30 preferably comprises a continuous ridge 351 which laterally defines the channel 35'. In particular, said continuous ridge 351 is positioned in contact with the internal surface 24*b*, thus creating a seal against product leakage.

In other words, the labyrinth seal 35 is shaped to provide a tortuous path suitable for placing the external environment in fluid connection with the main vent passage 26. In fact, the air may be drawn back, for example as a result of a depression, towards an internal compartment of the bottle 2 through the channel 35'; however, a small quantity of liquid that comes out of the main vent passage 26 may not go entirely through the channel 35' and exit outside the dispensing head 4. In particular, the continuous ridge 351 forces the liquid to continue along the channel 35', hindering the leakage, since it forms a meatus with the internal surface 24*b*.

According to an embodiment, the sleeve 30 comprises at least one circumferential sealing ridge 42*a*, projecting from the external surface 32*a* and positioned in contact with the internal surface 24*b*, creating a seal against product leakage therewith.

For example, the sleeve 30 comprises two axially spaced circumferential sealing ridges 42*a*, preferably side by side with and axially spaced from the labyrinth seal 35.

Preferably, moreover, the cylinder wall 24 comprises at least one circumferential sealing ridge formed in the internal surface at said at least one circumferential sealing ridge 42*a*, collaborating with this to provide a seal against product leakage.

For example, the cylinder wall 24 comprises two circumferential sealing ridges positioned at two circumferential sealing ridges 42*a*.

Preferably, the sleeve 30 further has a secondary vent passage 50 passing through the sleeve wall 32, which surfaces on the external surface 32*a*. The secondary vent passage 50 is suitable for placing the main vent passage 26 in communication with the external environment.

Preferably, the secondary vent passage 50 is positioned between the labyrinth seal 35 and a circumferential sealing ridge 42*a*.

Preferably, moreover, at a first axial end 42' of the sleeve wall 32, the sleeve wall 32 defines a head opening 33 of the sleeve 30, delimited by a sleeve edge 33*a*.

According to an embodiment, at a second axial end 42" from the sleeve wall 32 opposite the first axial end 42', the sleeve 30 comprises a bottom wall 34 incident, for example orthogonal, to the chamber axis K.

According to an embodiment, at the second axial end 42", the sleeve 30 comprises an annular end wall 36 projecting axially from the bottom wall 34, which defines a bottom opening 38 of the sleeve 30.

Preferably, said end wall 36 is radially lowered with respect to the sleeve wall 32.

The suction duct opens into the sleeve 30 through the bottom opening 38; in particular, the second suction segment 18 opens into the sleeve 30, for example into the compartment 360 delimited by the end wall 36.

Preferably, the external surface 32*a* of the sleeve wall 32 has a converging truncated conical shape, for example converging at the rear. Preferably, moreover, also a sealing portion 245*b* of the internal surface 24*b* has a truncated conical shape. For example, said sealing portion 245*b* collaborates with the labyrinth seal 35 to make a seal against product leakage.

According to an embodiment, the sleeve 30 comprises a bottom lip 43 which extends circumferentially, positioned at the second axial end 42" of the sleeve wall 32, for example projecting axially with respect to the sleeve wall 32.

Preferably, the bottom lip 43 has the shape of an annular crown.

Said bottom lip 43 is suitable for sealing the internal surface 24*b* which delimits the cylinder chamber 14, for example by elastically deforming radially towards the inside, to prevent leakage from the valve compartment 25' towards the cylinder chamber 14 and towards the external environment.

The bottom lip 43 is made in one piece with the sleeve 30, in particular with the sleeve wall 32 or the bottom wall 34, for example it is made of polypropylene PP.

Preferably, the bottom lip 43 is joined to the external surface 32*a*.

In particular, with the sleeve 30 mounted in the cylinder chamber 14, the bottom lip 43 faces, preferably projects, into the valve compartment 25'.

According to an embodiment, the bottom lip 43 extends radially in a divergent manner. That is, the bottom lip 43 is flared outwardly.

According to a different embodiment, the sleeve 30 comprises a sealing which ring 44 extends circumferentially, made by bi-injection integrally with the sleeve 30 and connected to the sleeve wall 32, preferably at the second axial end 42".

In particular, the sealing ring 44 is made of a material particularly suitable for sealing the internal surface 24*b* to prevent leakage from the valve compartment 25' towards the cylinder chamber 14 and towards the external environment.

According to an embodiment, the sleeve 30 is made of a first rigid material, to make the pressure chamber 30*a*, for example polypropylene, and the sealing ring 44 is made of a second material at least partially elastically deformable, for example low density polyethylene LDPE.

In order to further improve the seal, the sealing ring 44 preferably comprises a thickened portion 445 adapted to deform elastically by sealingly engaging the internal surface 24*b*.

Preferably, with the sleeve 30 mounted in the cylinder chamber 14, the sealing ring 44 faces the valve compartment 25'.

Preferably, the sealing ring 44 is joined to the external surface 32*a*.

The head 4 further comprises a manually operable piston 80 for translating between initial rest position and a final end-of-stroke position. The sleeve annularly defines a pressure chamber 30*a*, in which said piston 80 operates.

The piston 80 is inserted into the sleeve 30 through the head opening 33 and sealingly slides within said sleeve 30.

Preferably, the piston 80 is made in one piece of plastic material, obtained for example by injection molding.

The preferably hollow piston 80 comprises an annular piston wall 82 extending along a piston axis P between a front end 84 and a rear end 86.

Preferably, the piston 80 comprises a piston bottom 87 at the front end 84. At the rear end 86, the piston 80 has a piston coupling portion 90 for coupling to a trigger of the head 4, provided for example with holes 92.

Preferably, the piston 80 comprises a circumferential main piston seal 89 and a secondary piston seal 88, projecting externally from the piston wall 82. In particular, inside the sleeve 30, the main piston seal 89 axially delimits the pressure chamber 30*a* together with the bottom wall 25 where the suction duct opens, and in particular the second suction segment 18.

Preferably, the secondary vent passage 50 is open on the internal surface 32*b* of the sleeve 30 and between the main piston seal 89 and the secondary piston seal 88, in the initial rest position of the piston 80.

Preferably, at least one through connection opening 27 having a circumferential pattern is formed in the cylinder wall 24, for example a pair of diametrically opposite connection openings 27. For example, the connection opening 27 is peripherally defined by connection opening edges 270.

Furthermore, the sleeve 30 comprises at least one connection member 31, for example a pair of connection members 31, projecting radially from the external surface 32*a*. Said at least one connection member 31 is housed in the connection opening 27, making a shape coupling with this, to constrain the sleeve 30 in the cylinder chamber 14.

Preferably, the connection member 31 comprises a central slide 316 snapped into the connection opening 27, for example during the operations of inserting the sleeve 30 into the cylinder chamber 14, axially constraining the sleeve 30 into the cylinder chamber 14.

Preferably, the central slide 316 comprises a central step 316' facing forward, adapted to axially abut the connection opening edges 270 which define the connection opening 27.

In other words, the central slide 316 is axially inclined, for example converging towards the end wall 36.

Preferably, moreover, the connection member 31 comprises a pair of circumferential portions 318 having a circumferential extension substantially equal to the circumferential extension of the connection opening 27 in which they are housed, angularly constraining the sleeve 30 in the cylinder chamber 14.

Preferably, moreover, the connection member 31 comprises a pair of auxiliary slides 317 placed side by side with the central slide 316, for example angularly spaced from said central slide 316, thereby defining a pair of slide compartments 315.

Preferably, the auxiliary slides 317 are positioned at the circumferential portions 318.

In a first embodiment, the auxiliary slides 317 are at least partially inclined parallel to the central slide 316.

In a second embodiment, the auxiliary slides 317 are at least partially inclined circumferentially.

In a third embodiment, the auxiliary slides 317 are at least partially inclined both axially, i.e. parallel to the central slide 316, and at least partially inclined circumferentially.

Preferably, the cylinder chamber 14 has a variation in diameter which determines an annular compartment 141 with a larger diameter. Furthermore, the sleeve 30 comprises at least one axial rib 37 projecting radially from the external surface 32*a* which is housed in said annular compartment 141.

Preferably, the cylinder wall 24 comprises a step 243, at the variation in diameter, and a compartment wall 241 which annularly delimits said annular compartment 141.

In one embodiment, the at least one connection opening 27 is made in the compartment wall 241.

Preferably, the sleeve 30 comprises a plurality of angularly spaced axial ribs 37, positioned circumferentially between two connection members 31.

The head 4 further comprises a trigger 100, comprising a lever actuation portion 102 suitable for positioning the user's fingers for actuating the head 4, and a trigger engagement portion 104 for connecting with the piston 80. For example, the trigger 100 is hinged to the piston 80, for example by engagement of the trigger engagement portion 104 with the piston engagement portion 90 of the piston 80.

Preferably, the head 4 also comprises elastic return means suitable for operating permanently on the piston 80, directly or indirectly, to bring it to an initial position, which will be discussed later. For example, said return means comprise at least one flexible element 110, preferably a pair of flexible elements, made in one piece with the actuation portion 102 of the trigger 100.

Preferably, a valve compartment 25' is defined between the sleeve 30, the cylinder wall 24 and the bottom wall 25.

Preferably, the valve compartment 25' has an annular shape radially around the end wall 36.

The head 4 further comprises valve means suitable for regulating the flow of product from the suction duct to the pressure chamber **30*a* and from the pressure chamber 30*a* to the dispensing duct. Said e means are accommodated in the valve compartment 25'**.

Preferably, said valve means comprise an at least partially flexible valve element 200, made in a single piece, for example by injection molding.

According to an embodiment, the valve element 200 comprises a tubular portion 202 consisting of an annular valve wall 204 extending along a valve axis V, between a rear end 206 which defines a rear opening 208, and a front end 210.

The valve element 200 further comprises a flexible flap 212 connected in a cantilevered manner to the front end 210 of the valve wall 204, projecting radially internally.

The flap 212 has, from the side facing the rear opening 208, a shutter portion 214, for example flat or hemispherical or truncated-cone shape.

The valve element 200 further comprises an annular membrane 216 that extends radially externally from the tubular portion 202. The membrane 216 is, for example, concave on the side facing the front end 210 of the tubular portion 202, or according to further variants (not shown), the membrane 216 is flat or convex on the side facing the front end 210 of the tubular portion 202.

The valve element 200 further comprises a support portion 218 composed of an annular support wall 220 that connects to and surrounds the membrane 216.

Preferably, the membrane 216 extends in a radial direction beyond the end wall 36.

Preferably, the support wall 220 has a flared shape toward the front end 210 of the tubular portion 202 and, on the part facing the rear end 206, a wavy valve base 222 that forms a support for the valve element.

The valve element 200 is located in the cylinder chamber 14, against the bottom wall 25, against which the valve base 222 is placed; the support wall 220, on the other hand, is in contact with the cylinder wall 24 and creates a seal against product leakage.

The tubular portion 202 is threaded onto the suction duct, and in particular onto the second suction segment 18, and the flap 212 forms a flexible shutter for said suction duct. The suction mouth **18*a* of the suction duct and the flexible flap 212 form suitable suction valve means for allowing product to pass from the suction duct to the pressure chamber 30*a* in a suction step and preventing product from passing from the pressure chamber 30*a*** to the suction duct in a dispensing step.

The membrane 216 cooperates with the sleeve 30, and in particular closes the bottom opening 38 of the pressure chamber **30*a* and abuts against the end wall 36. The end wall 36 and the membrane 216 form pre-compression valve means suitable to allow product to pass from the pressure chamber 30*a* to the dispensing duct only when the pressure in the pressure chamber 30*a* exceeds a predetermined threshold value. Said pre-compression valves are also suitable for preventing the product from passing from the dispensing duct to the pressure chamber 30*a*** during a suction step.

The valve element 200, cooperating with the suction mouth **18*a* of the suction duct and the end wall 36** of the sleeve, thus integrates both the suction valve means and the pre-compression valve means into a single component.

In normal operation of the trigger dispensing device, the head 4 is applied to the bottle 2, so that the suction duct is in communication with the compartment inside the bottle 2 through the main opening **12*a***.

Figure 3:
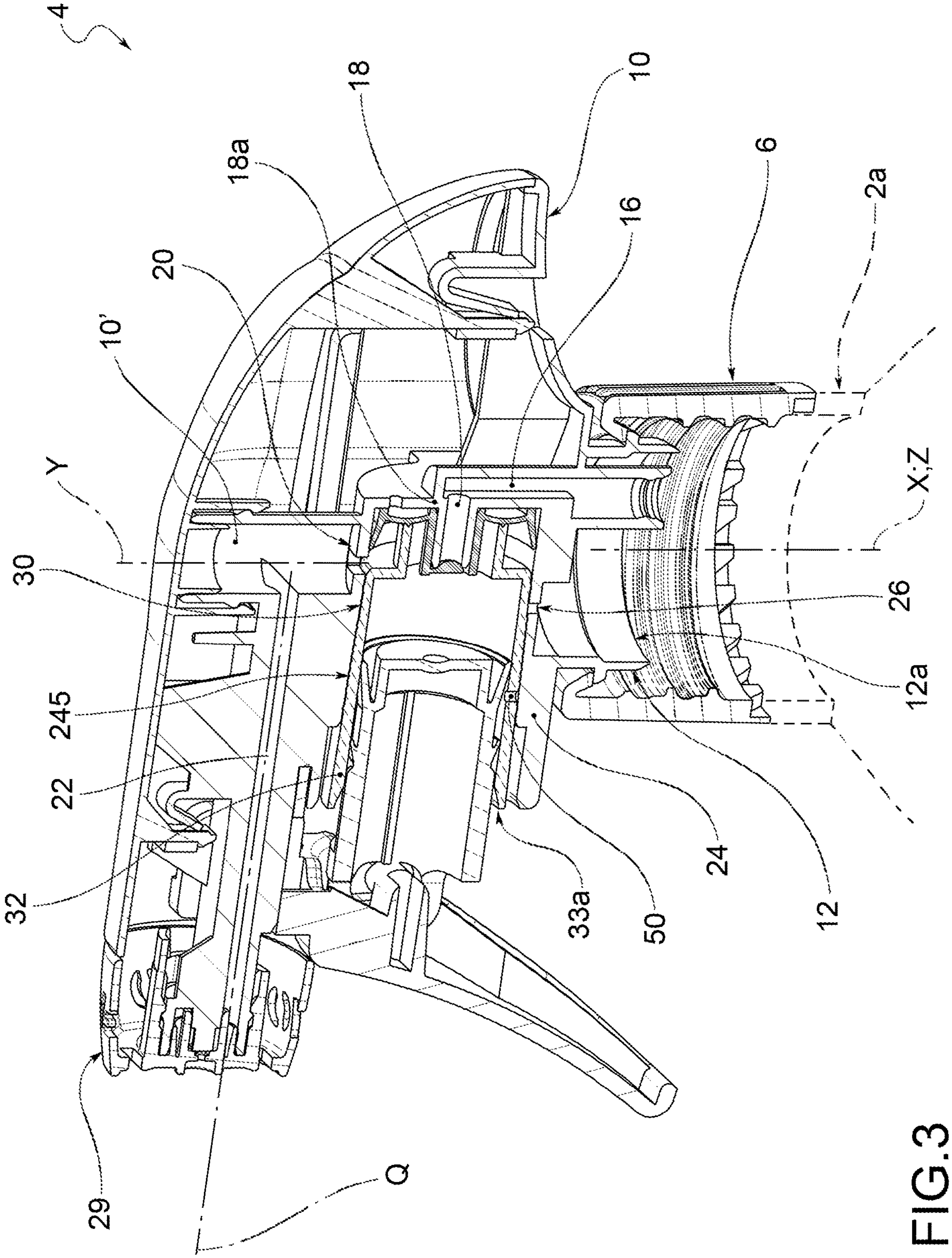
FIG. 3 illustrates an axial sectional view of the trigger dispensing device in an initial configuration, according to an embodiment of the present invention.

Preferably, in an initial configuration in which the trigger 100 and the piston 80 are in a respective initial rest position (FIG. 3), the pre-compression valve means and the valve suction means are in a respective closed configuration.

Furthermore, preferably, in the initial configuration, the secondary vent passage 50 is axially included between the main piston seal 89 and the secondary piston seal 88 of the piston 80.

Furthermore, preferably, in the initial configuration, the main vent passage 26 is fluidically isolated from the external environment.

By actuating the trigger 100, the axial translation of the piston 80 occurs, said piston moving within the sleeve 30 and putting pressure on the product contained in the pressure chamber **30*a***.

Preferably, as long as the secondary piston seal 88 is positioned beyond the secondary vent passage 50, the secondary vent passage 50 is in fluid communication with the external environment.

Figure 4:
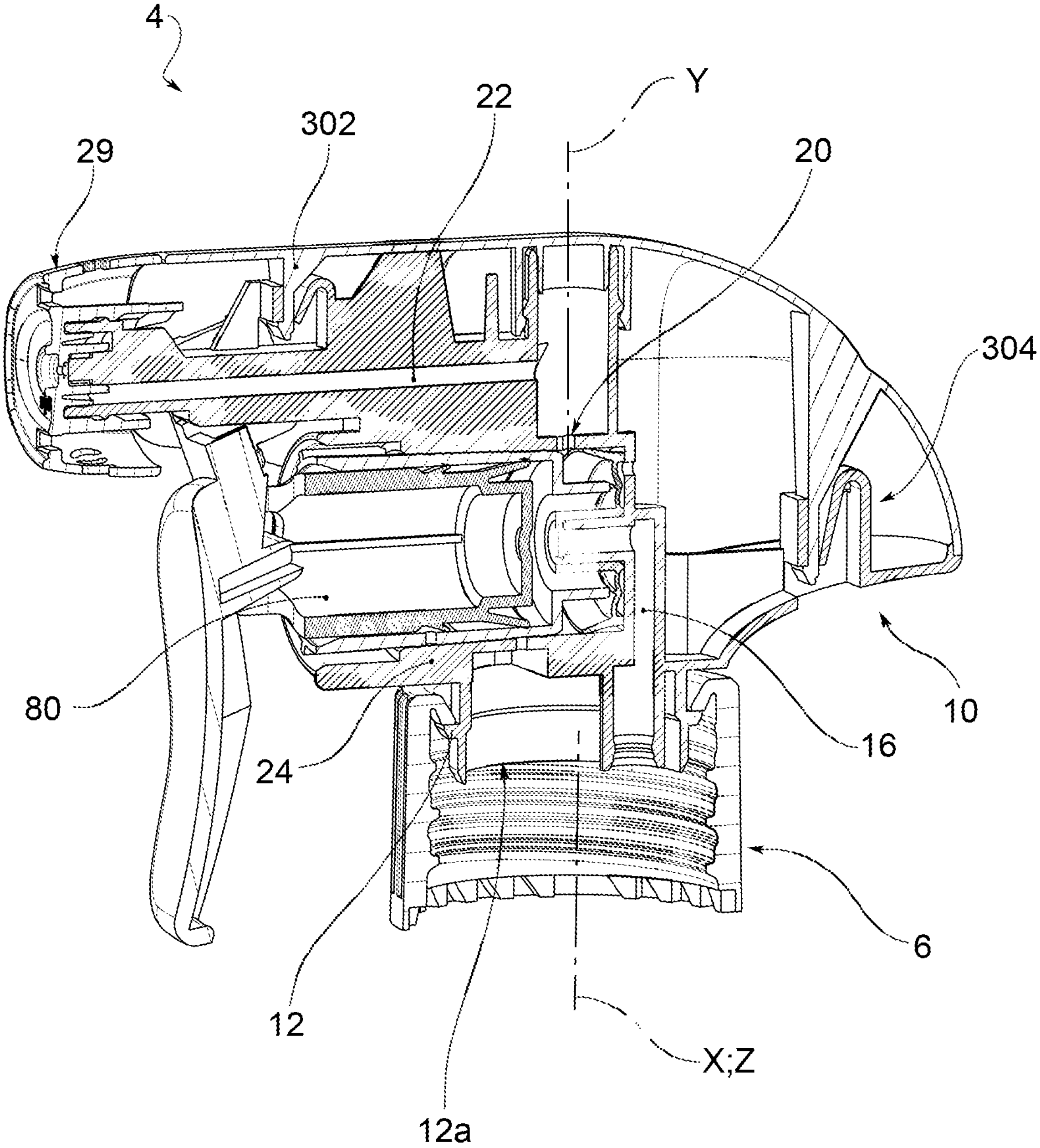
FIG. 4 is a sectional view of the trigger dispensing head in an intermediate trigger actuation configuration.

Once a predefined threshold pressure in the pressure chamber **30*a* has been exceeded, the pre-compression valve means switch to an open configuration in which they allow the passage of the product from the pressure chamber 30*a* to the dispensing duct (FIG. 4**).

Specifically, the membrane 216 separates from the end wall 36 of the sleeve 30 and allows the product to pass to the dispensing duct, allowing it to be dispensed externally through the nozzle 29 (dispensing step). The suction valve means remain in the closed configuration.

Figure 5:
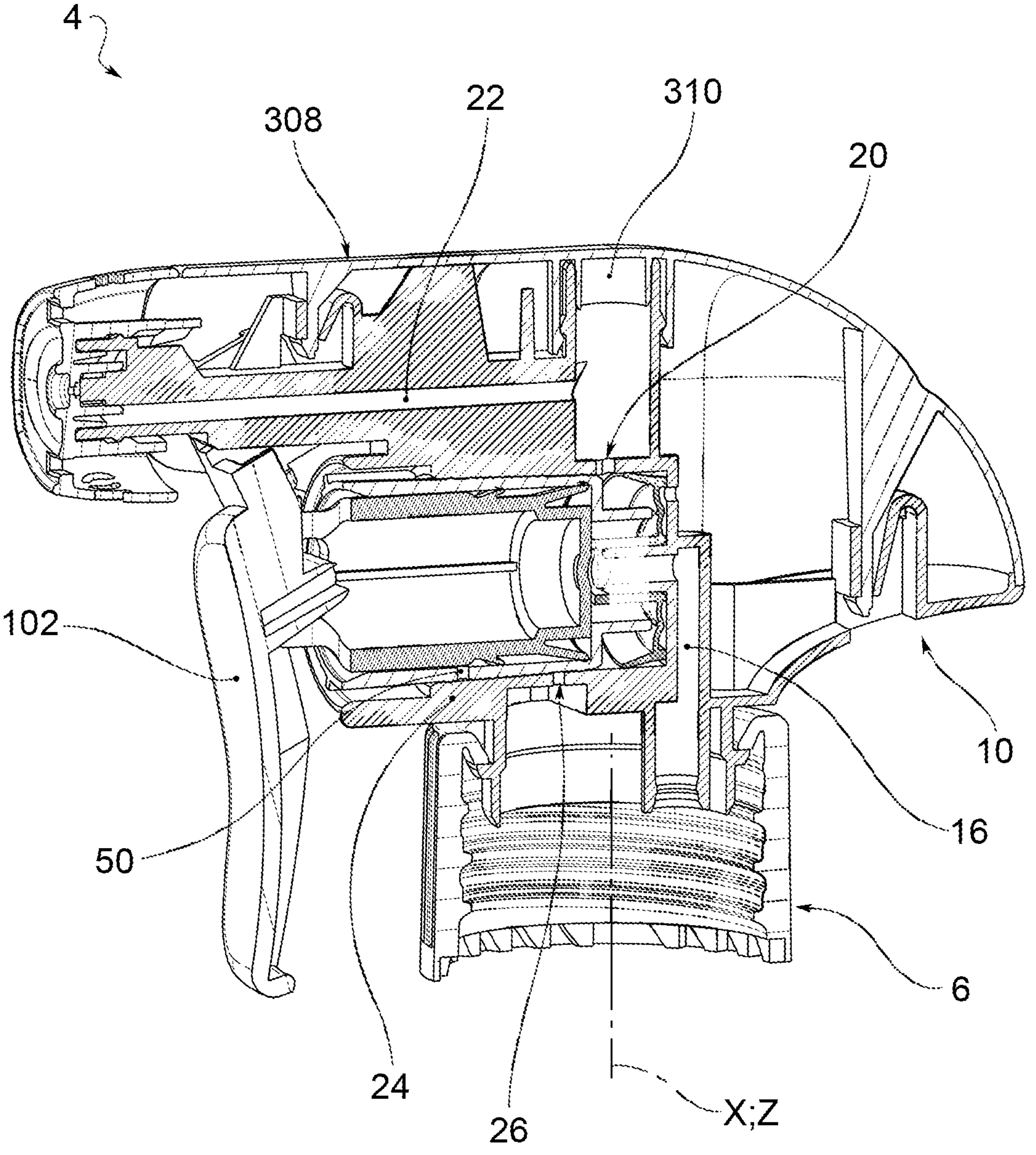
FIG. 5 illustrates a sectional view of the trigger dispensing head in an end-of-stroke configuration of the piston, with pre-compression valve means in an opening configuration.

Once the trigger 100 and the piston 80 have reached the end-of-stroke position (FIG. 5) and the dispensing step has finished, the trigger 100 is released and the elastic return means operates to return the piston 80 and the trigger 100 to the initial rest position.

Figure 6:
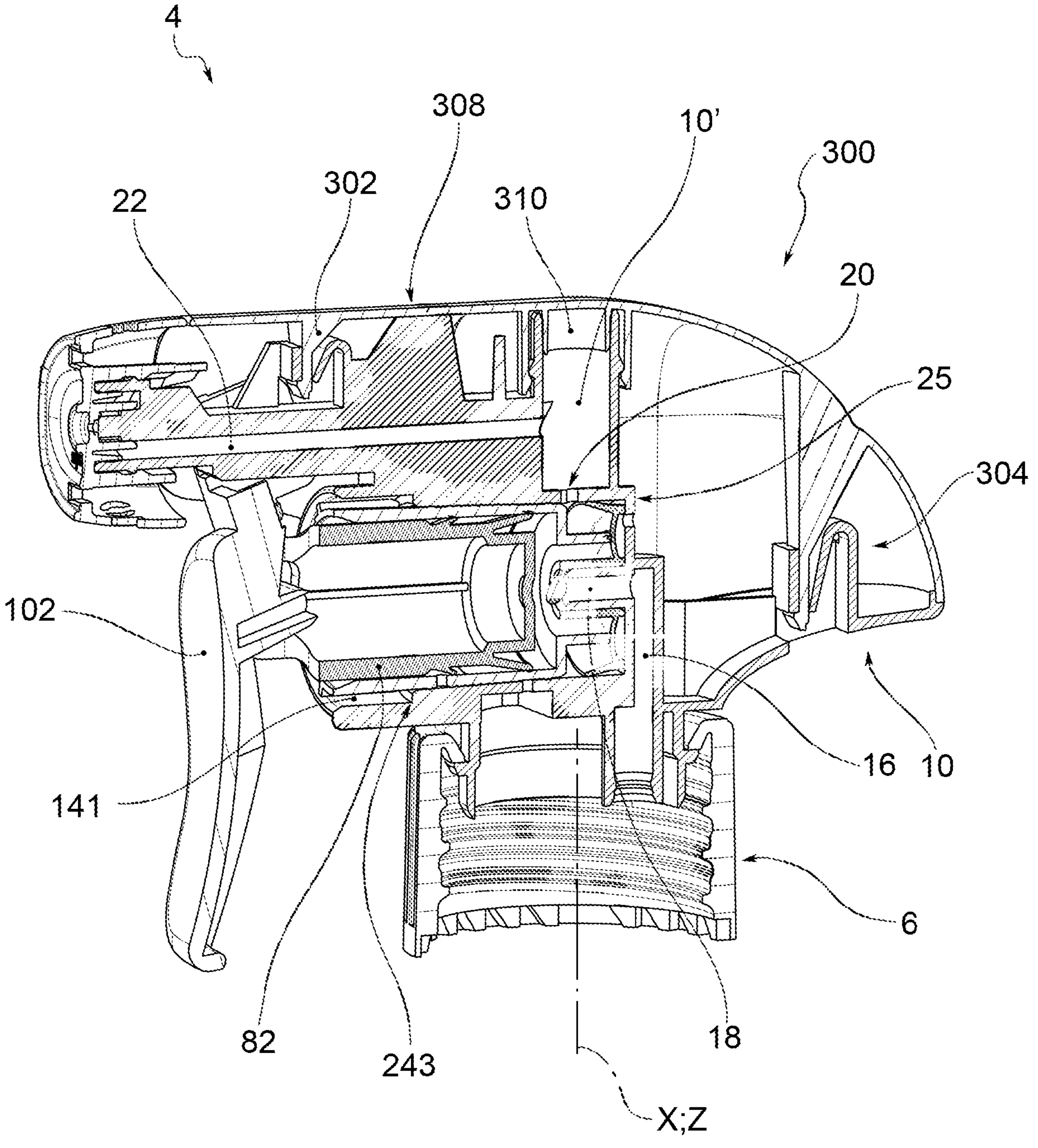
FIG. 6 shows a sectional view of the trigger dispensing head in a trigger release configuration.
Figure 7:
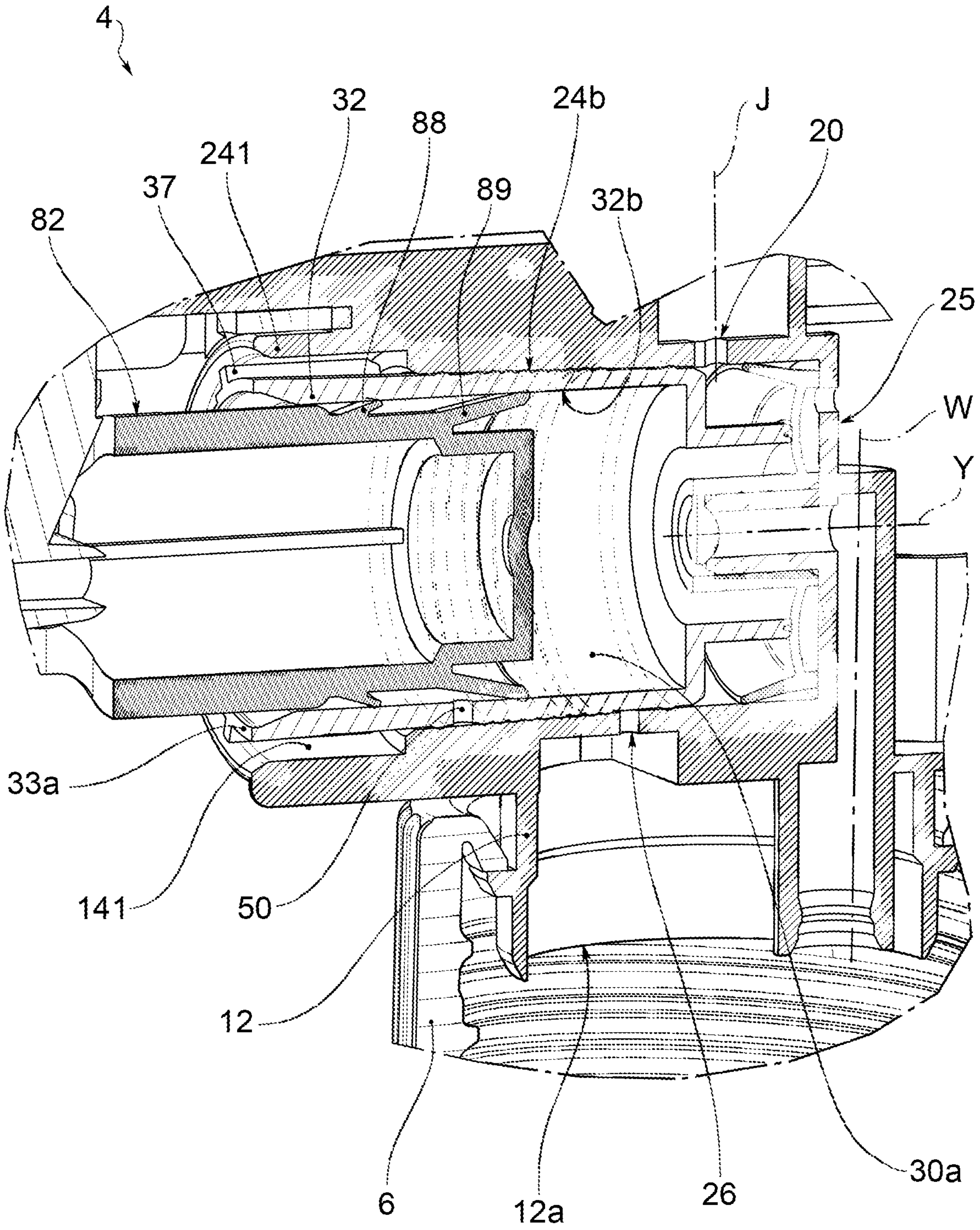
FIG. 7 shows an enlarged detail of FIG. 3.
Figure 8:
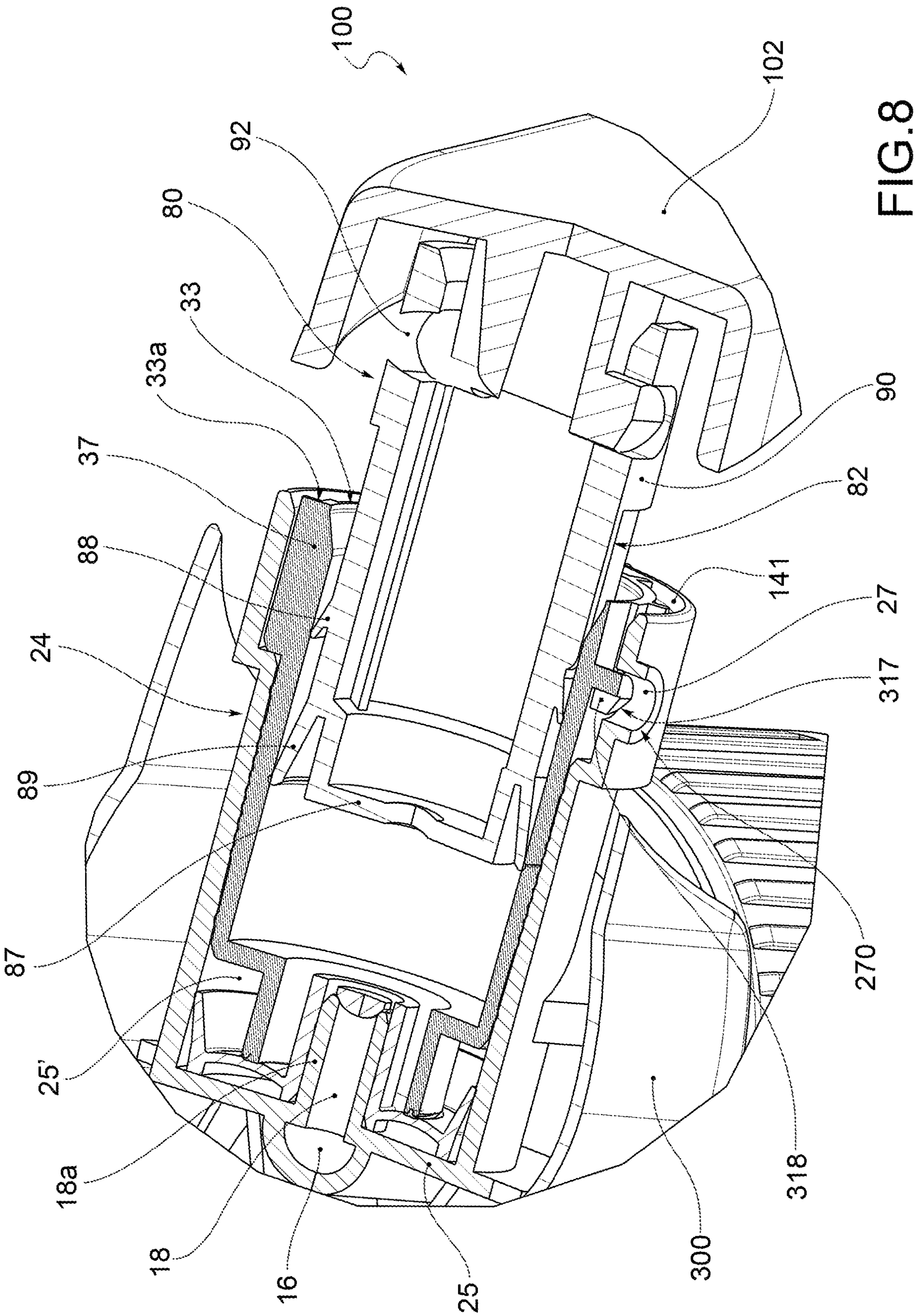
FIG. 8 shows a cross-sectional view of the dispensing head of FIG. 3.
Figure 9:
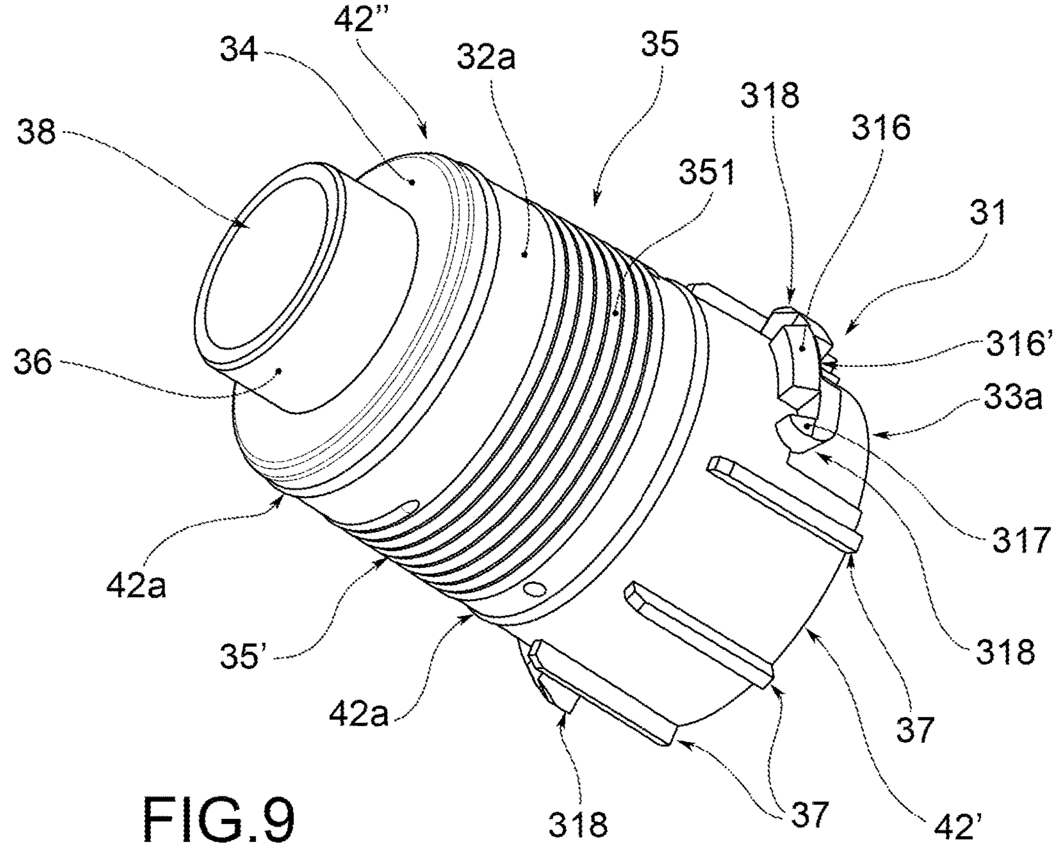
FIGS. 9, 10 and 11 show a sleeve of the dispensing head, a side view thereof and a front view thereof, respectively.
Figure 10:
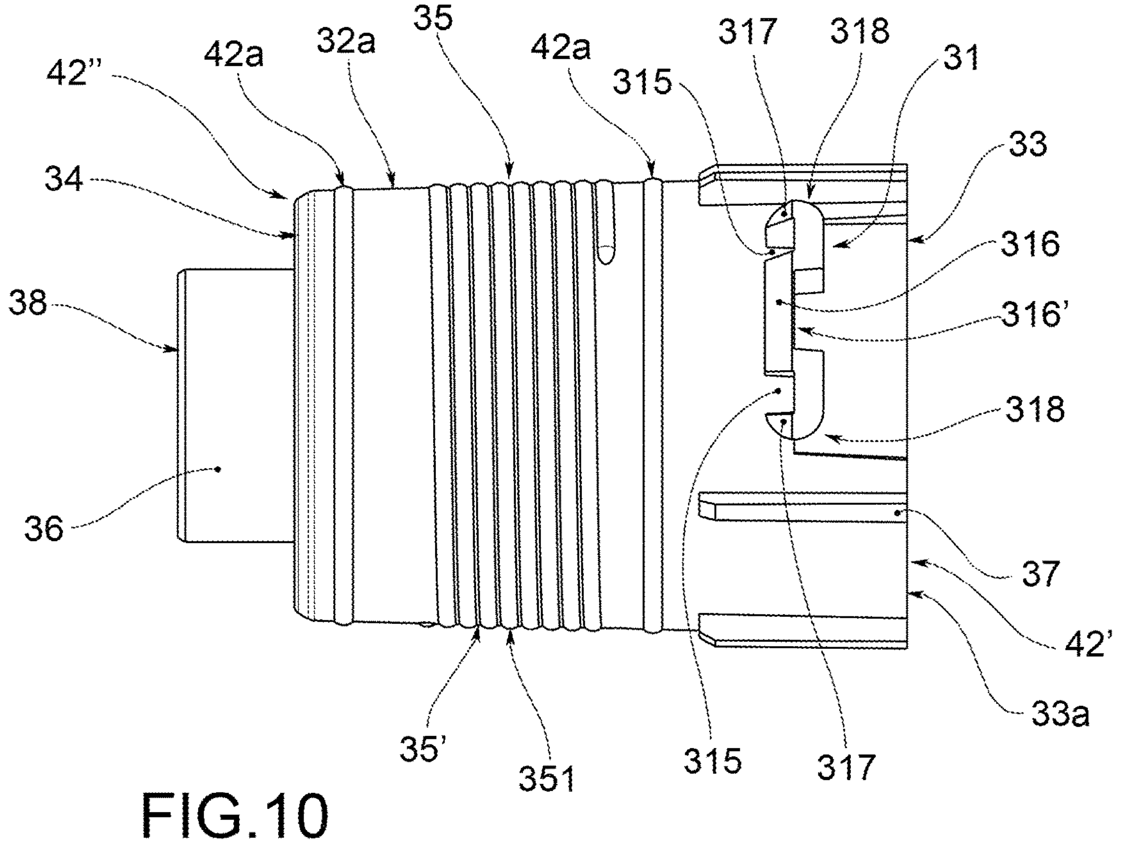
Figure 11:
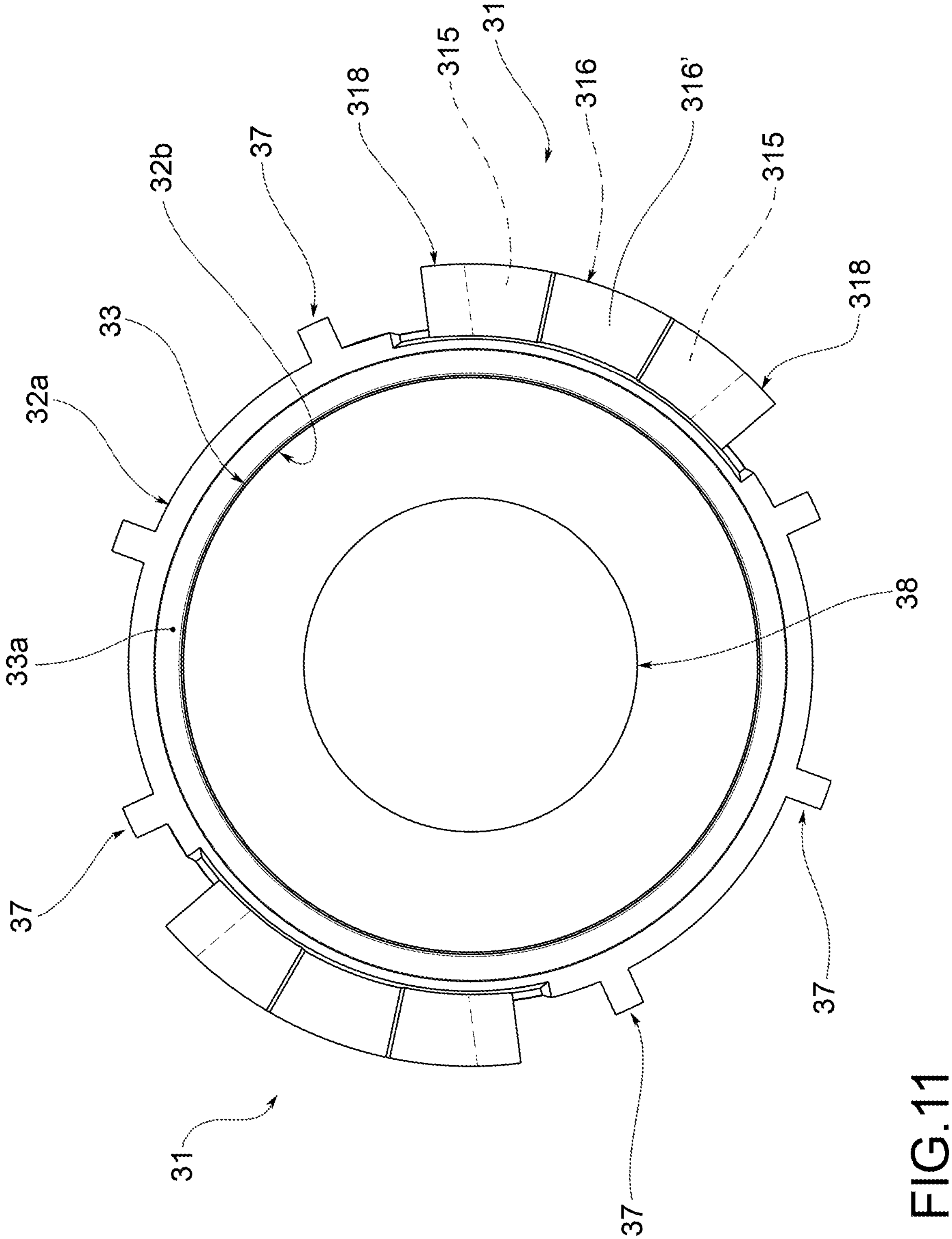
Figure 12:
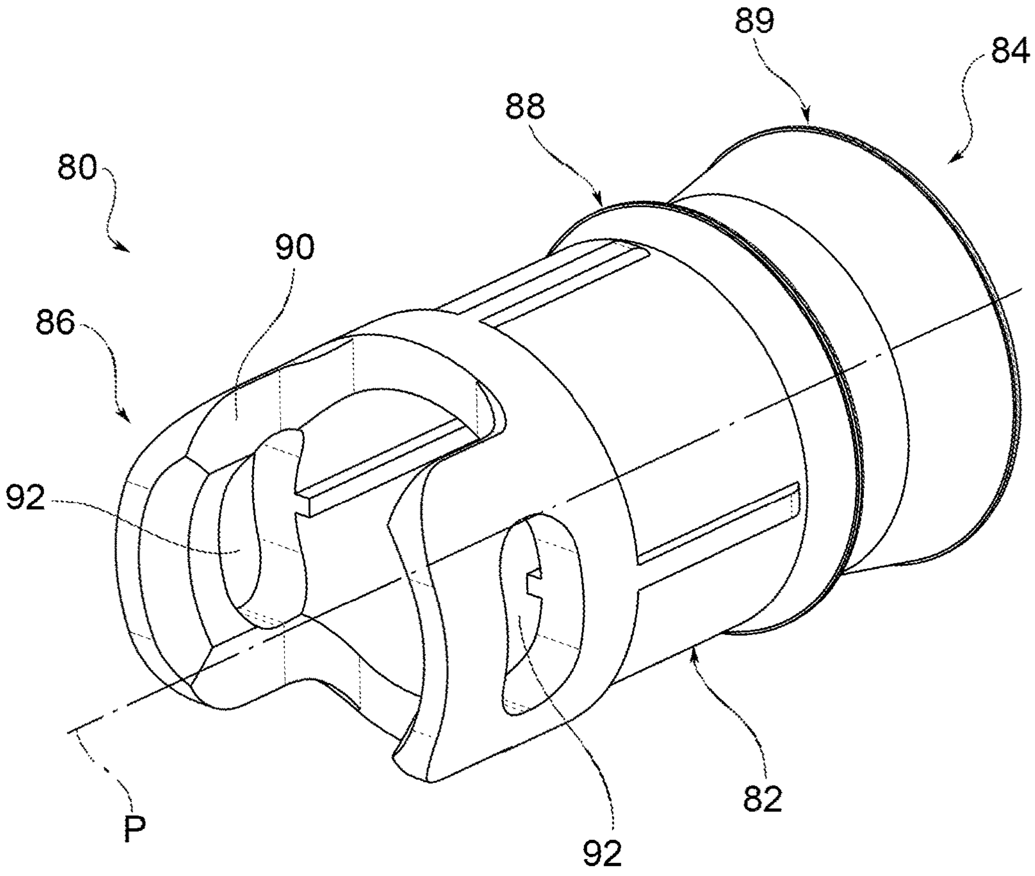
FIGS. 12 and 13 show a piston of the dispensing head and a sectional view thereof, respectively.
Figure 13:
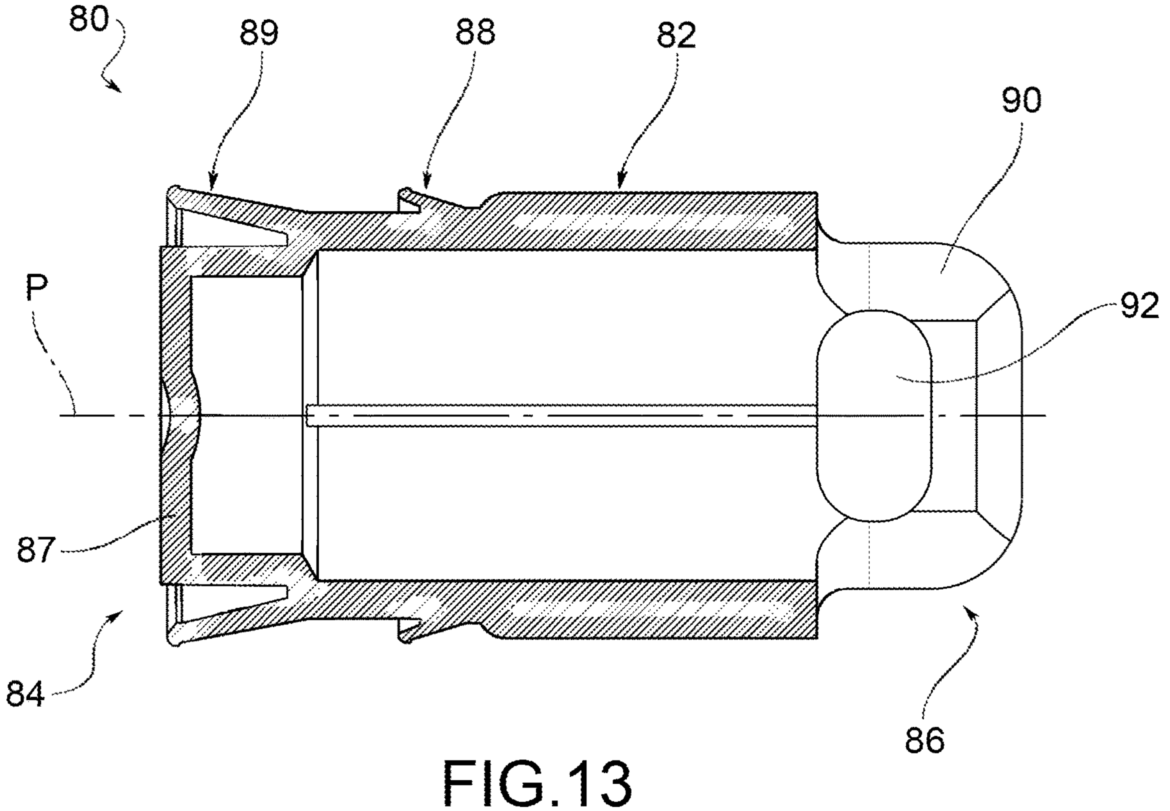
Figure 14:
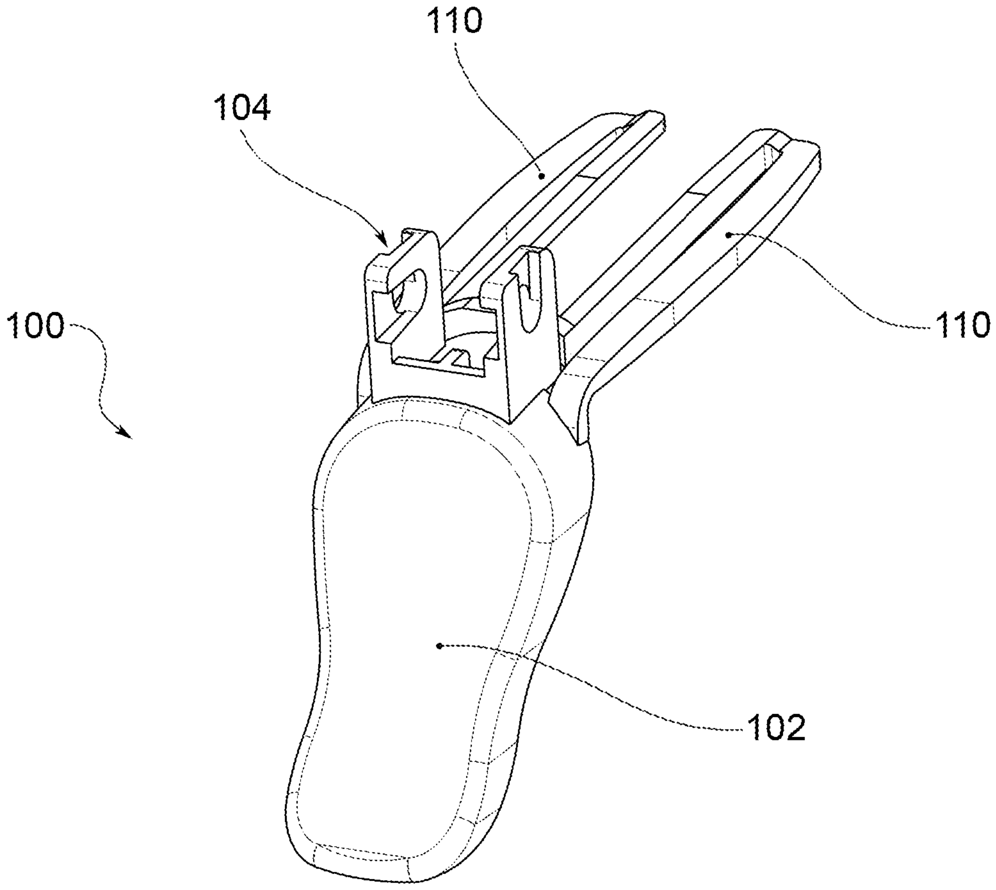
FIGS. 14 and 15 show a trigger of the dispensing head and a sectional view thereof, respectively.
Figure 15:
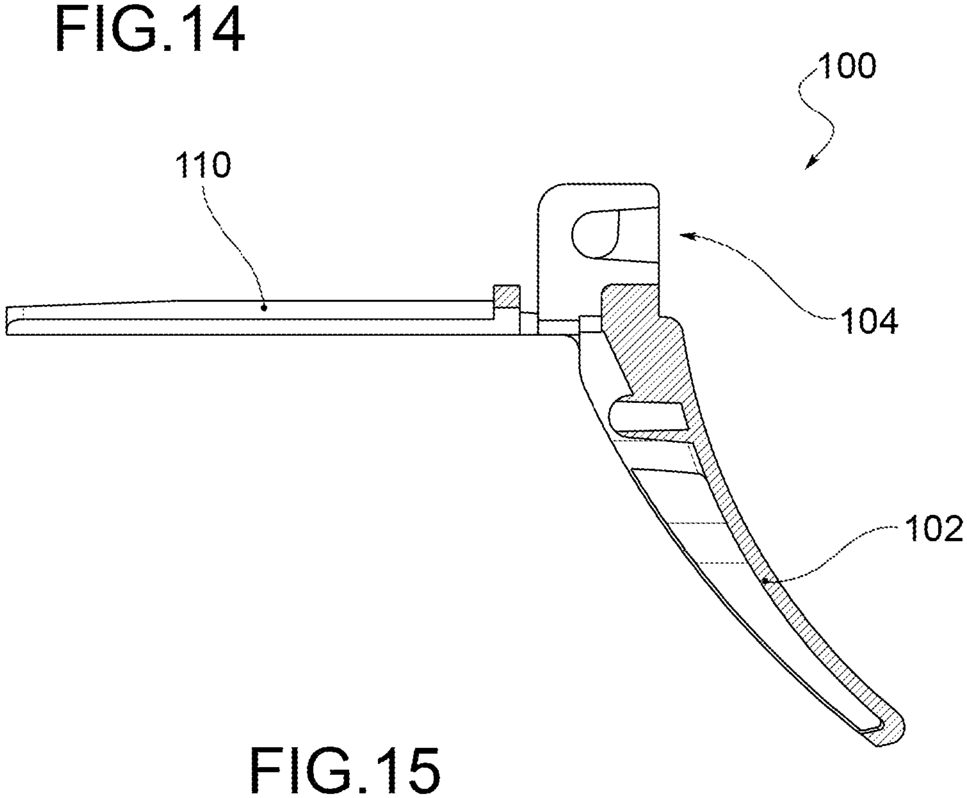
Figure 16:
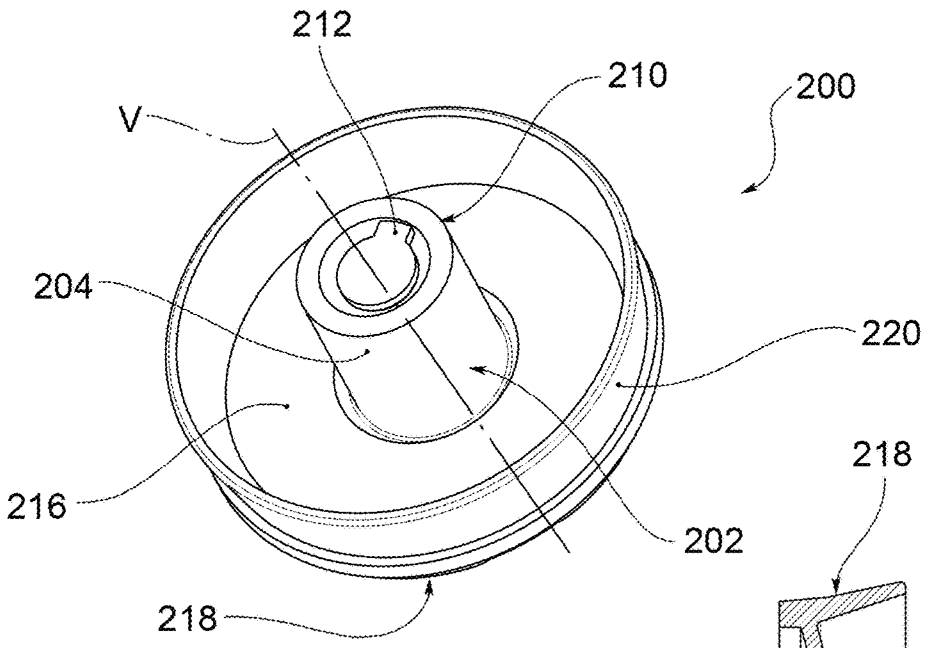
FIGS. 16, 17 and 18 show a valve element of the dispensing head, a plan view thereof and a sectional thereof, respectively.
Figure 18:
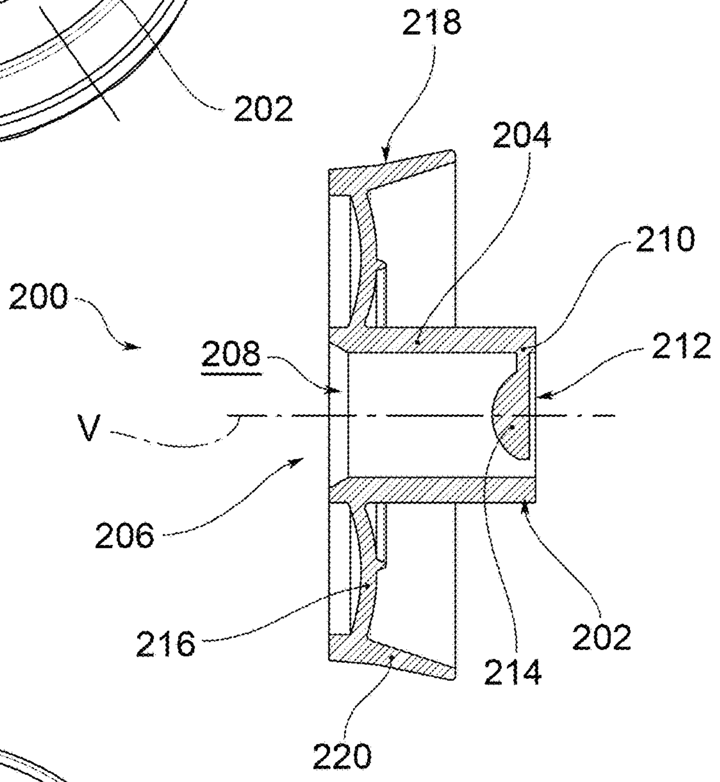
Figure 17:
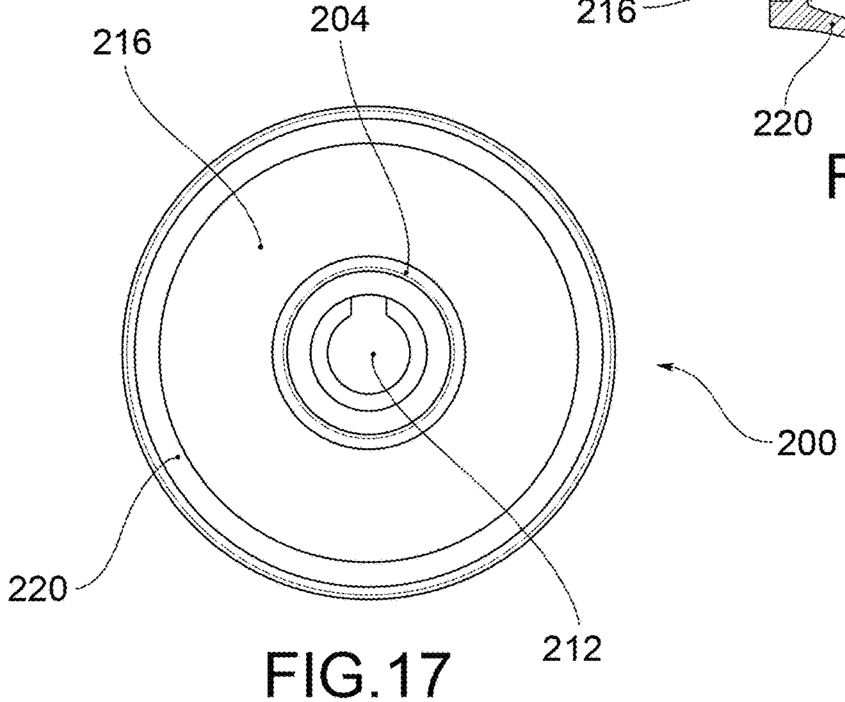

The return of the piston 80 towards the initial rest position causes a depression in the pressure chamber **30*a*, which causes the switching of the suction valve means to an open configuration in which they allow the suction of the product from the suction duct into the pressure chamber 30***a* (FIG. 6).

In particular, the membrane 216 bends and detaches from the suction mouth 18*a* of the suction duct, allowing the product to pass from the suction duct into the pressure chamber 30*a* (suction step).

Furthermore, in the suction step, the internal compartment of the bottle is in communication with the external environment through the secondary vent passage 50, the channel 35' of the labyrinth seal 35 and the main vent passage 26.

According to a different embodiment, the valve element 200 comprises the annular valve wall 204 and an engagement wall 260 projecting from the membrane 216 along the valve axis V, for example concentric to the annular valve wall 204.

Preferably, the engagement wall 260 has an external engagement surface 260*a* having at least one end zone, distal from the membrane 216, flared outwards.

In addition, the end wall 36 of the sleeve 30 comprises an internal end surface 36*a* facing the compartment 360 delimited by the end wall 36.

In particular, the internal end surface 36*a* comprises a first portion 36*a*' axially ending with the bottom opening 38, and a second portion 36*a*" connected to the first portion 36*a*', for example of a truncated conical shape, ending at the base of the end wall 36, i.e. proximal to the bottom wall 34.

Cooperating with the internal end surface 36*a* of the end wall 36, the engagement wall 260 forms pre-compression valve means suitable to allow product to pass from the pressure chamber 30*a* to the dispensing duct only when the pressure in the pressure chamber 30*a* exceeds a predetermined threshold value.

In an initial configuration of the trigger 80, the engagement wall 260, preferably the flared end zone thereof, is in contact with the internal end surface 36*a*, preferably the second portion 36*a*" thereof.

The sliding of the piston 80 generates a progressive increase in pressure in the pressure chamber 30*a*, causing the elastic deformation of the membrane 216 and the sliding of the engagement wall 260 along the internal end surface 36*a*, in the direction of the bottom wall 25. In this step, the pressurized product to be dispensed enters at least in part into the compartment 360.

Once a predefined threshold pressure in the pressure chamber 30*a* has been exceeded, for example the first portion 36*a*' has been reached, the engagement wall 260 allows the product to leave the compartment 360 and flow towards the valve compartment 25' (dispensing step).

For this purpose, for example, the end wall 36 has an inlet window 365 passing radially and open in the first portion 36*a'*.

Figure 19:
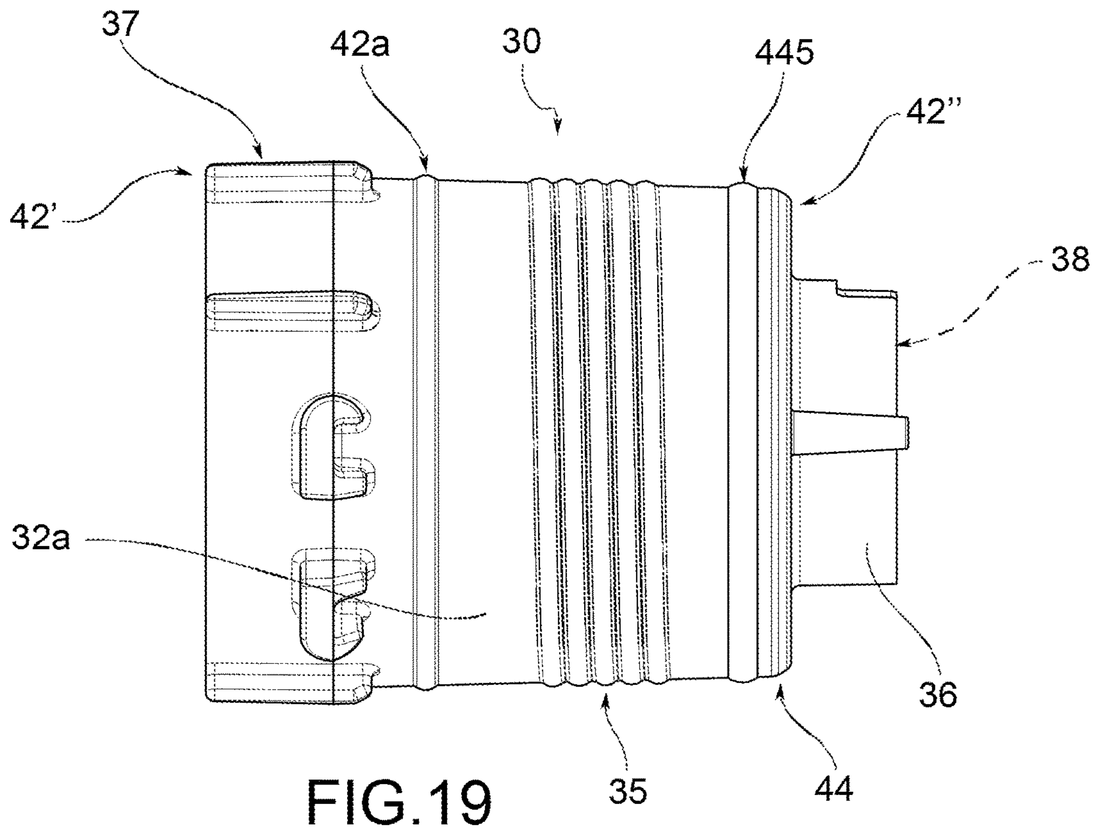
FIGS. 19, 19*a* show a sleeve and a sectional view thereof, respectively, according to a first embodiment.
Figure 19A:
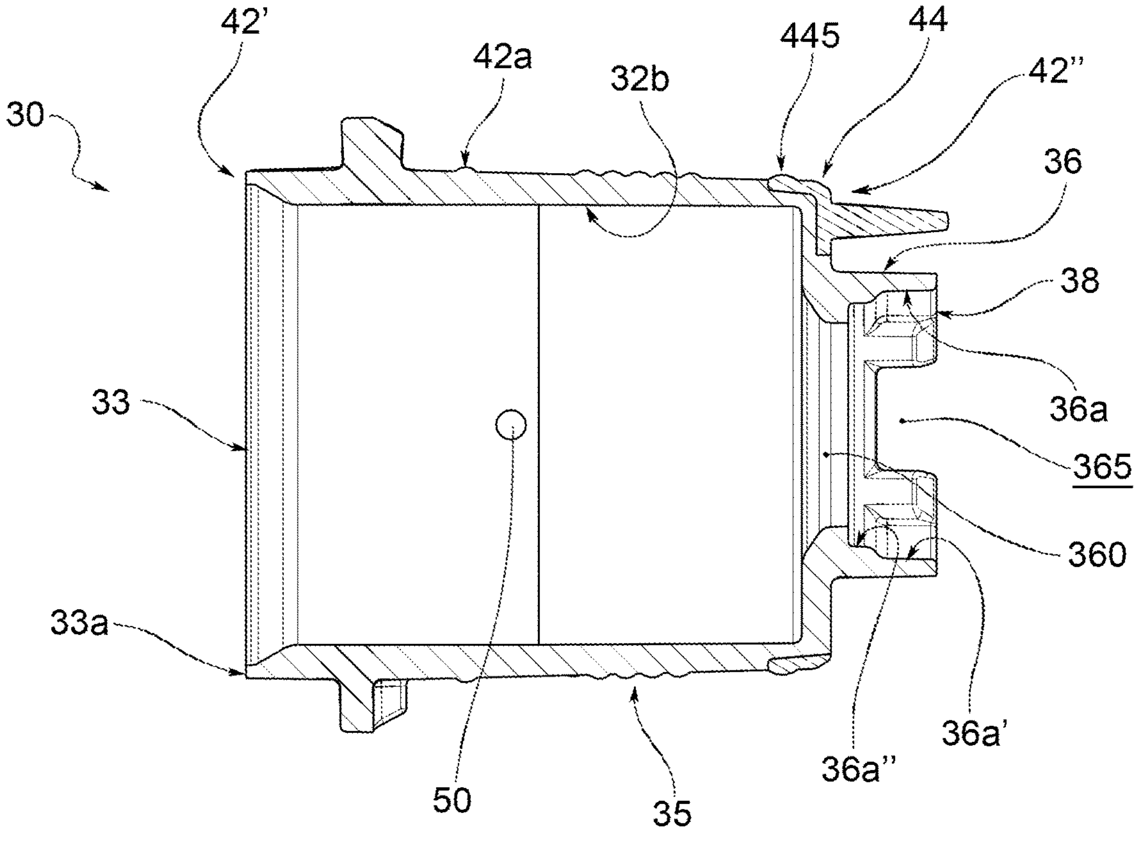
Figure 19B:
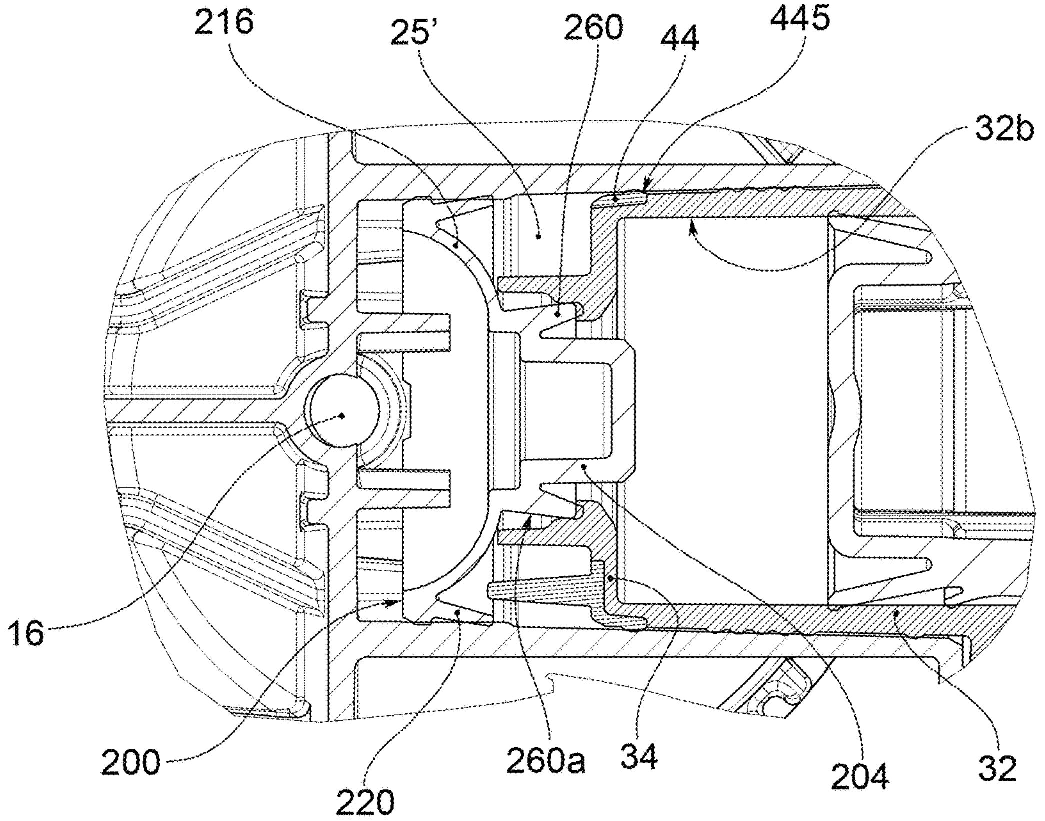
FIGS. 19*b*, 19*c* show an enlarged detail of the dispensing head, according to the first embodiment, on a sectional plane incident to the suction axis W and a sectional plane parallel to the suction axis W, respectively.
Figure 19C:
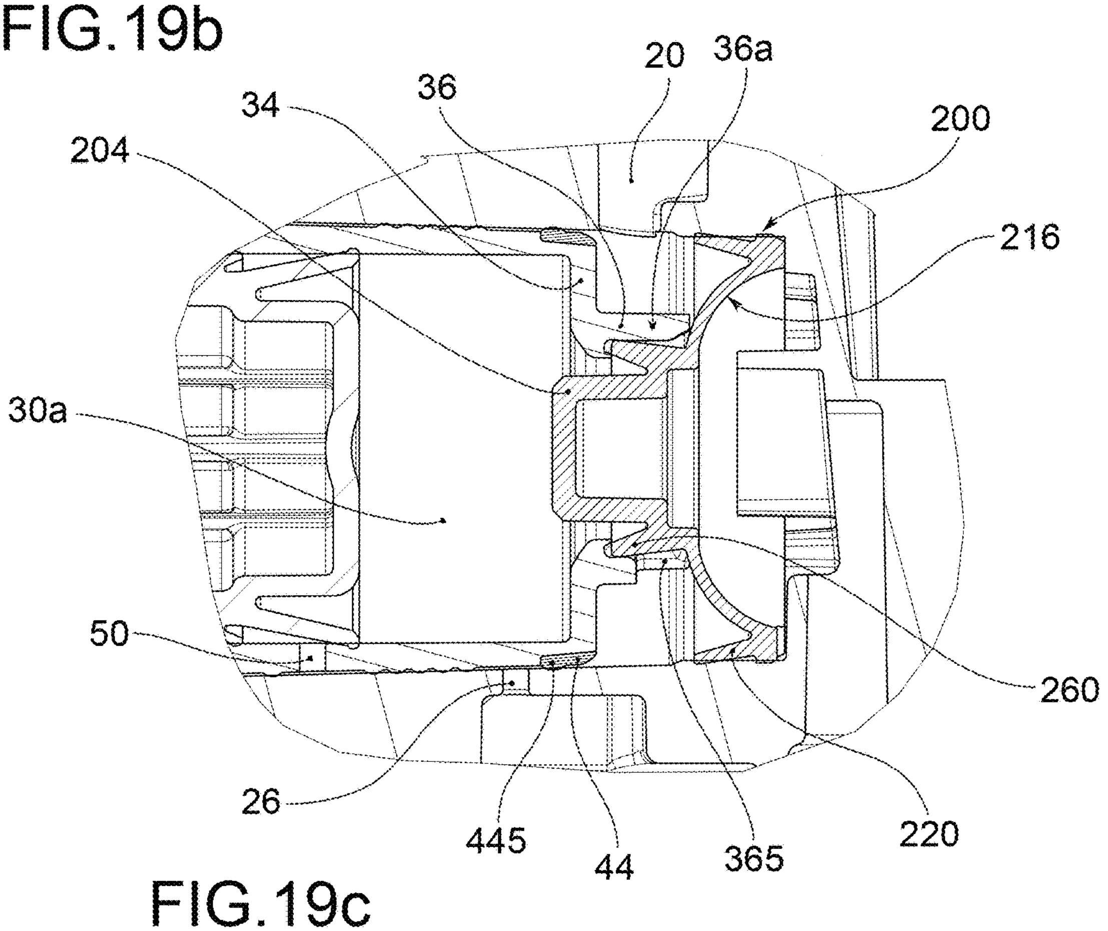
Figure 20:
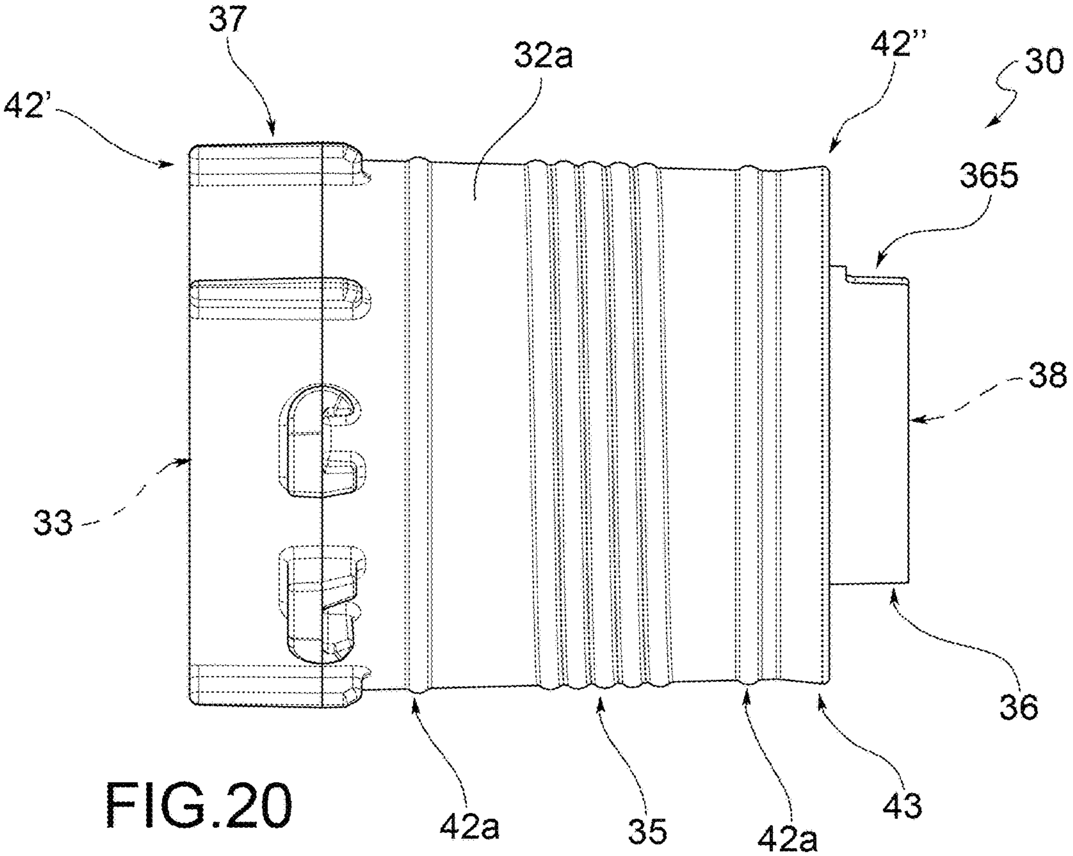
FIGS. 20 and 20*a* show a sleeve and a sectional view thereof, respectively, according to a second embodiment.
Figure 20A:
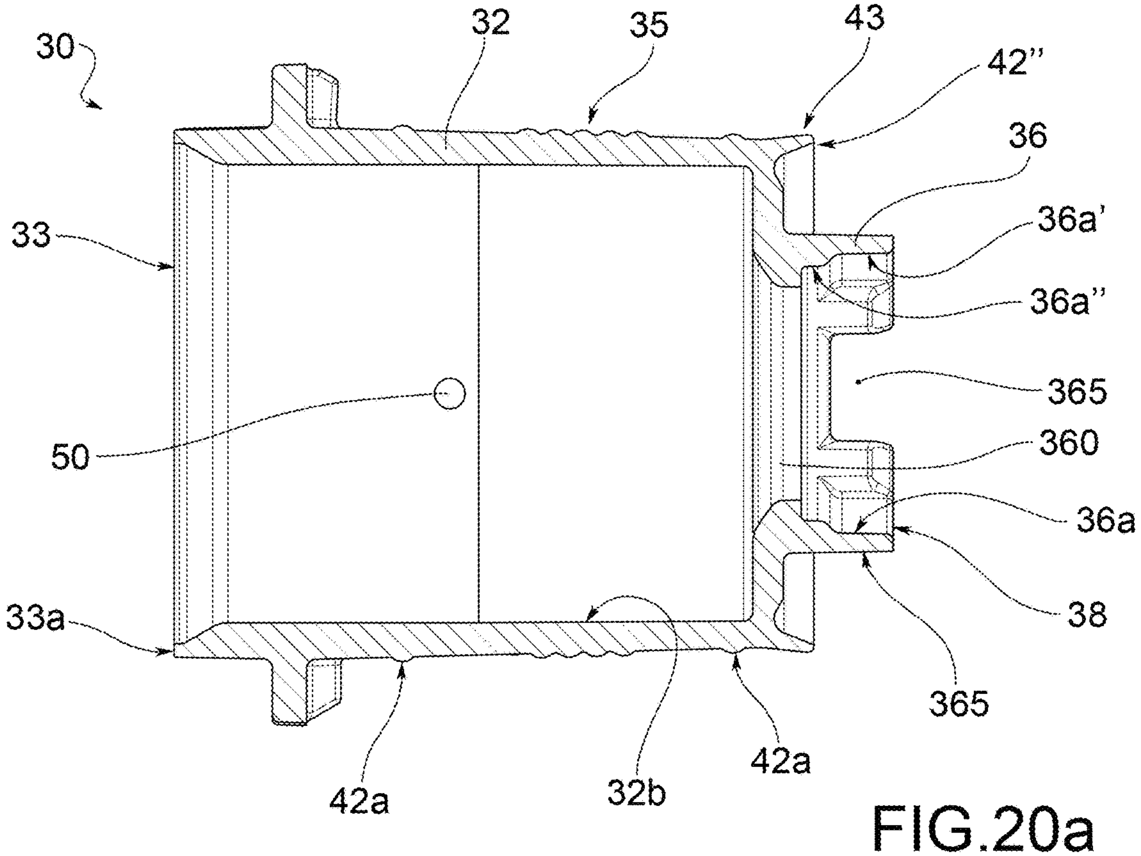
Figure 20B:
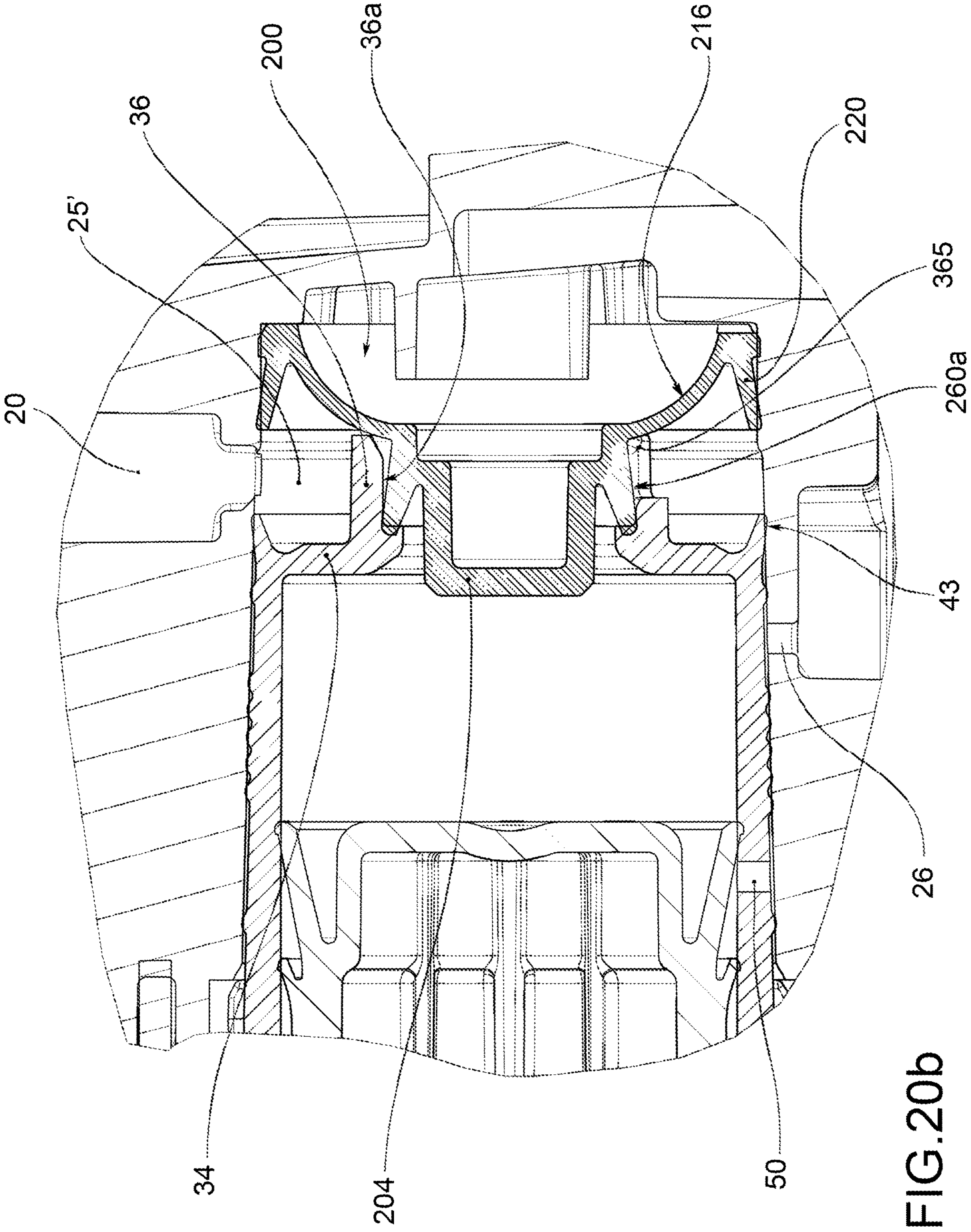
FIG. 20*b* shows an enlarged detail of the dispensing head, according to the second embodiment, on a sectional plane parallel to the suction axis W.

In the embodiment of FIGS. 19 to 20*b*, the flexible flap 212 is replaced by a notch (not shown) in the valve wall 204, defined between separable lips to allow the passage of product towards the pressure chamber 30*a* (suction step).

Further details on the operation of the pre-compression valve means are described in international applications WO-A1-2014/013352 and WO2012/069939 in the name of the Applicant.

According to a preferred embodiment, moreover, the head 4 comprises a shell 300 attached to the frame 10 to cover it. Preferably, the shell 300 is applied to the frame 10 by at least one snap coupling.

For example, a first snap coupling 302 arranged in an upper region of the frame 10, such as above the second dispensing segment 22, and a second snap coupling 304, arranged in a lower region of the frame, for example below the bottom wall 25 of the cylinder chamber 14, are provided.

Preferably, moreover, an upper surface 306 of the shell 300 comprises a flat region 308. Advantageously, said region allows any weight on the device to be better supported, for example during storage in the warehouse, avoiding the detachment of the shell from the frame.

According to an embodiment, moreover, wherein the first dispensing segment 20 is formed in the frame 10 and extends along the first suction axis J orthogonal to the chamber axis K, the frame 10 also has an extension 10' of the first dispensing segment 20 along said first suction axis J.

The extension 10' is itself open to the outside in order to allow, during the molding of the frame, the introduction of a core for forming the first dispensing segment 20.

Preferably, the shell 300 comprises a cap 310, protruding internally, suitable for closing off access to the outside of the extension 10'.

Innovatively, the dispensing head described above meets the needs of the sector and overcomes the aforementioned drawbacks, since it allows a high seal against possible product leakage.

Advantageously, in fact, in a horizontal or overturned position during transport or storage, a leak of liquid that comes out of the bottle, for example through the main vent passage, runs into numerous sealing portions.

Advantageously, the labyrinth seal creates a tortuous path which considerably reduces and prevents the escape of liquid from the main vent passage.

Advantageously, the sleeve engages the cylinder chamber in a fixed position, and in particular in a fixed angular position, further improving the seal. In fact, as verified by the Applicant, if the sleeve is free to move in the cylinder chamber, it undergoes malfunctions and leaks, with consequent product leakage.

Advantageously, the bottom lip of the sleeve effectively reduces the leakage of product under pressure present in the valve compartment.

Advantageously, the bi-injected sealing ring with the sleeve further improves the seal against product leakage from the valve compartment. In particular, the bi-injected sealing ring achieves a better seal than that provided by the sleeve made of rigid material.

Advantageously, moreover, the piston slides inside the sleeve, which is substantially free of shrinkage after molding; the sliding takes place, therefore, on a surface having a high cylindricity which ensures a better seal.

It is understood that those skilled in the art, in order to meet contingent needs, could make modifications to the dispensing head described above, all of which are contained within the scope of protection as defined by the following claims.

What is claimed is:

1. A trigger dispensing head applicable to a bottle of a trigger dispensing device for dispensing a product, the trigger dispensing head comprising:

- a frame, suitable for supporting components of the trigger dispensing head, comprising a main opening in communication with an internal compartment of the bottle;
- a cylinder chamber annularly delimited by a cylinder wall having an internal surface, wherein a main vent passage is formed in the cylinder wall, putting in communication the main opening with the internal surface;
- a manually operable piston for translating between an initial rest position and a final end-of-stroke position;
- a pressure chamber in which said manually operable piston operates;

a sleeve delimiting said pressure chamber, at least partially housed in the cylinder chamber, comprising an annular sleeve wall having an external surface and an internal surface;

a suction duct suitable for putting the internal compartment of the bottle in communication with the pressure chamber;

a dispensing duct suitable for putting the pressure chamber in communication with an external environment;

valve means for adjusting a flow of the product from the suction duct to the pressure chamber during a suction step and from the pressure chamber to the dispensing duct during a dispensing step; and a labyrinth seal suitable for putting the main vent passage in communication with the external environment, the labyrinth seal comprising a channel formed in an external surface of the sleeve, the channel having a spiral configuration in which the channel extends circumferentially around a circumference of the sleeve a plurality of times, wherein the sleeve includes a continuous, spiral ridge that defines lateral edges of the channel, said continuous ridge extending radially outward from the external surface of the sleeve and into contact with the internal surface of the cylinder wall, thereby creating a seal against product leakage.

2. The trigger dispensing head of claim 1, wherein the sleeve is housed in a fixed angular position in the cylinder chamber.

3. The trigger dispensing head of claim 1, wherein the sleeve further comprises at least one circumferential sealing ridge projecting from the external surface of the sleeve and axially spaced from the labyrinth seal, the circumferential sealing ridge contacting the internal surface of the cylinder wall, further creating the seal against product leakage therewith.

4. The trigger dispensing head of claim 1, wherein the sleeve further comprises a secondary vent passage passing in the annular sleeve wall and suitable for putting the main vent passage in communication with the external environment.

5. The trigger dispensing head of claim 4, wherein the sleeve further comprises at least one circumferential sealing ridge projecting from the external surface of the sleeve and axially spaced from the labyrinth seal, the circumferential sealing ridge contacting the internal surface of the cylinder wall, further creating the seal against product leakage therewith, and wherein the secondary vent passage is positioned between the labyrinth seal and the at least one circumferential sealing ridge.

6. The trigger dispensing head of claim 4, wherein the manually operable piston comprises a main piston seal and a secondary piston seal that sealingly and slidably engage the internal surface of the annular sleeve wall, and wherein the secondary vent passage is open on the internal surface of the annular sleeve wall, between the main piston seal and the secondary piston seal in the initial rest position of the manually operable piston.

7. The trigger dispensing head of claim 1, wherein the sleeve further comprises a bottom lip projecting with respect to the annular sleeve wall, suitable for sealingly engaging the internal surface of the cylinder wall.

8. The trigger dispensing head of claim 1, wherein the sleeve further comprises a sealing ring made by bi-injection, connected to the annular sleeve wall and suitable for sealingly engaging the internal surface of the cylinder wall and wherein the sleeve is made of a first rigid material, and the sealing ring is made of a second at least partially elastically deformable material.

9. The trigger dispensing head of claim 8, wherein the first rigid material is polypropylene, and wherein the second at least partially elastically deformable material is low density polyethylene.

10. The trigger dispensing head of claim 1, further comprising a radially through connection opening in the cylinder wall, wherein the sleeve further comprises at least one connection member, projecting radially from the external surface of the sleeve, that makes a shape coupling with the connection opening to constrain the sleeve in the cylinder chamber.

11. The trigger dispensing head of claim 10, wherein the at least one connection member comprises a central slide snapped into the connection opening, axially constraining the sleeve in the cylinder chamber.

12. The trigger dispensing head of claim 11, wherein the at least one connection member comprises a pair of circumferential portions having a circumferential extension equal to a circumferential extension of the connection opening in which the circumferential portions are housed, angularly constraining the sleeve in the cylinder chamber.

13. The trigger dispensing head of claim 11, wherein the at least one connection member comprises a pair of auxiliary slides adjacent to the central slide, and wherein said auxiliary slides are at least partially inclined parallel to the central slide and/or at least partially inclined circumferentially.

14. The trigger dispensing head of claim 12, wherein the at least one connection member comprises a pair of auxiliary slides adjacent to the central slide, and wherein said auxiliary slides are at least partially inclined parallel to the central slide and/or at least partially inclined circumferentially, and wherein the auxiliary slides are positioned at the circumferential portions.

15. The trigger dispensing head of claim 1, wherein the cylinder chamber has a variation in diameter that determines an annular compartment with a larger diameter, and wherein the sleeve further comprises at least one axial rib projecting radially from the external surface of a portion of the sleeve that is housed in said annular compartment.

16. The trigger dispensing head of claim 15, further comprising a radially through connection opening in the cylinder wall, wherein the sleeve further comprises at least one connection member, projecting radially from the external surface of the sleeve, that makes a shape coupling with the connection opening to constrain the sleeve in the cylinder chamber, and comprising at least one pair of diametrically opposite connection members and a plurality of axial ribs positioned circumferentially between said at least one pair of diametrically opposite connection members.

17. The trigger dispensing head of claim 1, wherein the external surface of the sleeve has a frustoconical shape.

* * * * *